(12) United States Patent
Williams

(10) Patent No.: US 7,483,682 B2
(45) Date of Patent: Jan. 27, 2009

(54) DUAL-BAND RADIO ENABLED LAPEL MOUNTED AUDIO AND SIGNAL HANDLING SYSTEM AND METHOD

(75) Inventor: Robby Gordon Williams, Calgary (CA)

(73) Assignee: Clearcalm Inc. (CA)

(*) Notice: Subject to any disclaimer, the term of this patent is extended or adjusted under 35 U.S.C. 154(b) by 761 days.

(21) Appl. No.: 10/819,998

(22) Filed: Apr. 8, 2004

(65) Prior Publication Data
US 2005/0227650 A1   Oct. 13, 2005

(51) Int. Cl.
H04B 1/40 (2006.01)
G11B 7/00 (2006.01)
(52) U.S. Cl. .................... 455/180.1; 455/90.1
(58) Field of Classification Search .......... 455/517, 455/518, 519, 520, 521, 552.1, 11.1, 15, 455/20, 100, 179.1, 188.1, 334, 180.1, 180.3, 455/90.1, 90.2, 90.3
See application file for complete search history.

(56) References Cited

U.S. PATENT DOCUMENTS

| 3,745,462 | A | * | 7/1973 | Trimble ............... 455/11.1 |
| 4,072,831 | A | | 2/1978 | Joscelyn |
| 4,357,711 | A | | 11/1982 | Drefko et al. |
| 4,491,699 | A | | 1/1985 | Walker |
| 4,627,107 | A | * | 12/1986 | Hohlfeld et al. ........ 455/11.1 |
| 4,879,755 | A | * | 11/1989 | Stolarczyk et al. ........ 725/41 |
| 4,885,796 | A | | 12/1989 | Loftus et al. |
| 5,060,308 | A | | 10/1991 | Bieback |
| 5,163,158 | A | * | 11/1992 | Tendler et al. .......... 455/11.1 |
| 5,369,783 | A | * | 11/1994 | Childress et al. .......... 455/17 |

(Continued)

FOREIGN PATENT DOCUMENTS

EP    0 377 316 A2   7/1990

(Continued)

OTHER PUBLICATIONS www.safteytechindustries.com; Team Talk; Mar. 1, 2001, web.archive.org (wayback machine).

(Continued)

*Primary Examiner*—Blane J Jackson
(74) *Attorney, Agent, or Firm*—Rothwell, Figg, Ernst & Manbeck, PC

(57) ABSTRACT

An apparatus for communicating using multiple channels. The apparatus includes a first radio receiver and a controller. The first radio receiver is configured to produce a first receive signal in response to a first radio frequency signal in a first frequency band. The controller has a first receive input for receiving the first receive signal, an audio input for receiving an audio in signal, a selector input for receiving a selector signal, an audio output for producing an audio out signal and a first transmitter output for producing a first transmitter signal. The first transmit output is configured for communication with a radio transmitter operable to transmit a second radio frequency signal in a second frequency band different from the first frequency band. The controller is configured to cause the audio output to produce the audio out signal in response to the first receive signal when the selector signal is in a first state and to cause the first transmitter output to produce the first transmit signal in response to the audio in signal when the selector signal is in a second state.

74 Claims, 18 Drawing Sheets

U.S. PATENT DOCUMENTS

| | | | |
|---|---|---|---|
| 5,404,577 A * | 4/1995 | Zuckerman et al. | 455/66.1 |
| 5,566,362 A * | 10/1996 | Bauer et al. | 455/90.3 |
| 5,678,205 A | 10/1997 | Gray | |
| 5,990,793 A | 11/1999 | Bieback | |
| 6,006,106 A * | 12/1999 | Cook et al. | 455/552.1 |
| 6,121,881 A | 9/2000 | Bieback et al. | |
| 6,199,550 B1 | 3/2001 | Wiesmann et al. | |
| 6,351,652 B1 * | 2/2002 | Finn et al. | 455/552.1 |
| 6,647,244 B1 * | 11/2003 | Haymond et al. | 455/11.1 |
| 6,952,590 B2 * | 10/2005 | Legare et al. | 455/511 |
| 7,155,251 B2 * | 12/2006 | Saruwatari et al. | 455/552.1 |
| 2003/0224838 A1 * | 12/2003 | Skillicorn et al. | 455/575.2 |
| 2004/0022395 A1 | 2/2004 | Turnbull | |

FOREIGN PATENT DOCUMENTS

| | | |
|---|---|---|
| EP | 1 026 908 A2 | 8/2000 |
| EP | 1026908 A2 | 8/2000 |
| WO | WO 94/05372 A1 | 3/1994 |
| WO | WO 00/72456 A1 | 11/2000 |
| WO | WO 03/103773 A1 | 12/2003 |

OTHER PUBLICATIONS

Advertisements published on pp. 38 and 75 in "Fire Chief" Magazine, Jan. 1999.

www.safteytechindustries.com; Team Talk; at least as early as Jun. 25, 2001.

Advertisment published in "Fire Chief" Magazine, Jan. 1999.

Search Report issued in GB0622279.8, May 29, 2008.

* cited by examiner

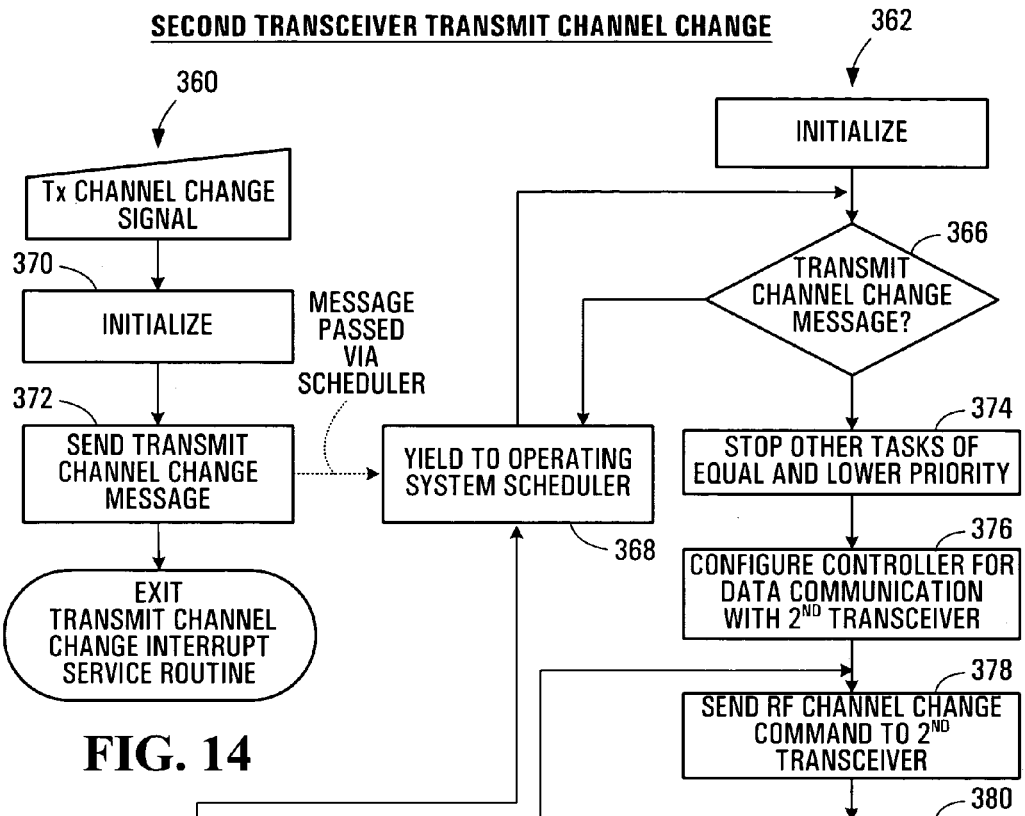
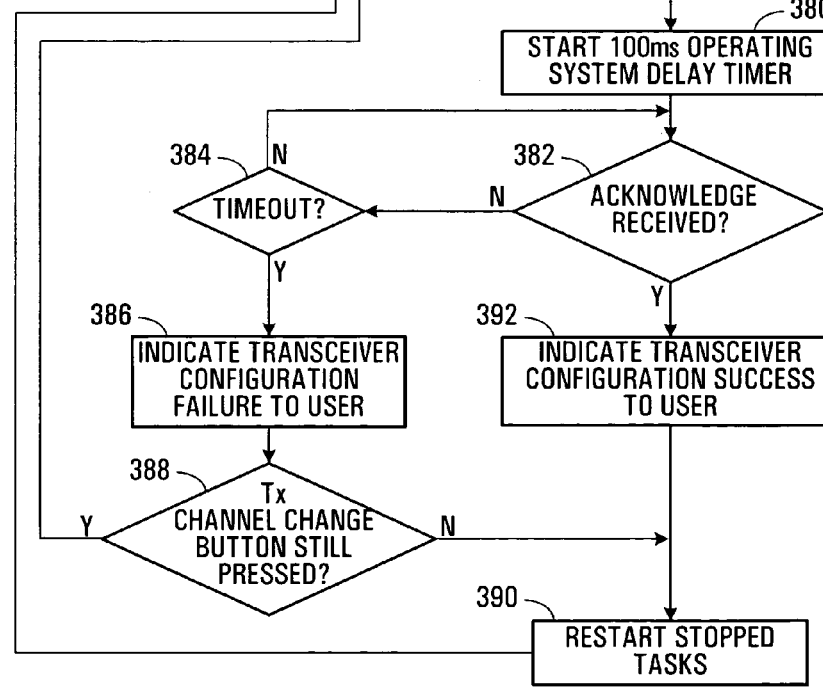
FIG. 14
FIG. 15

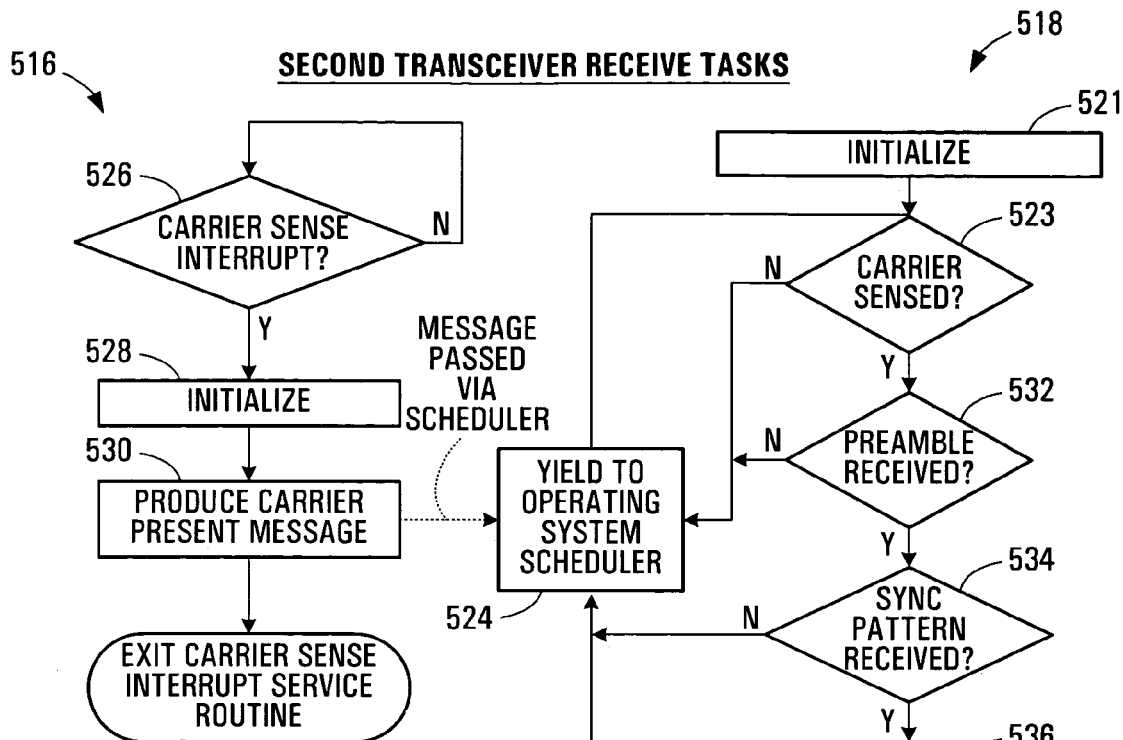
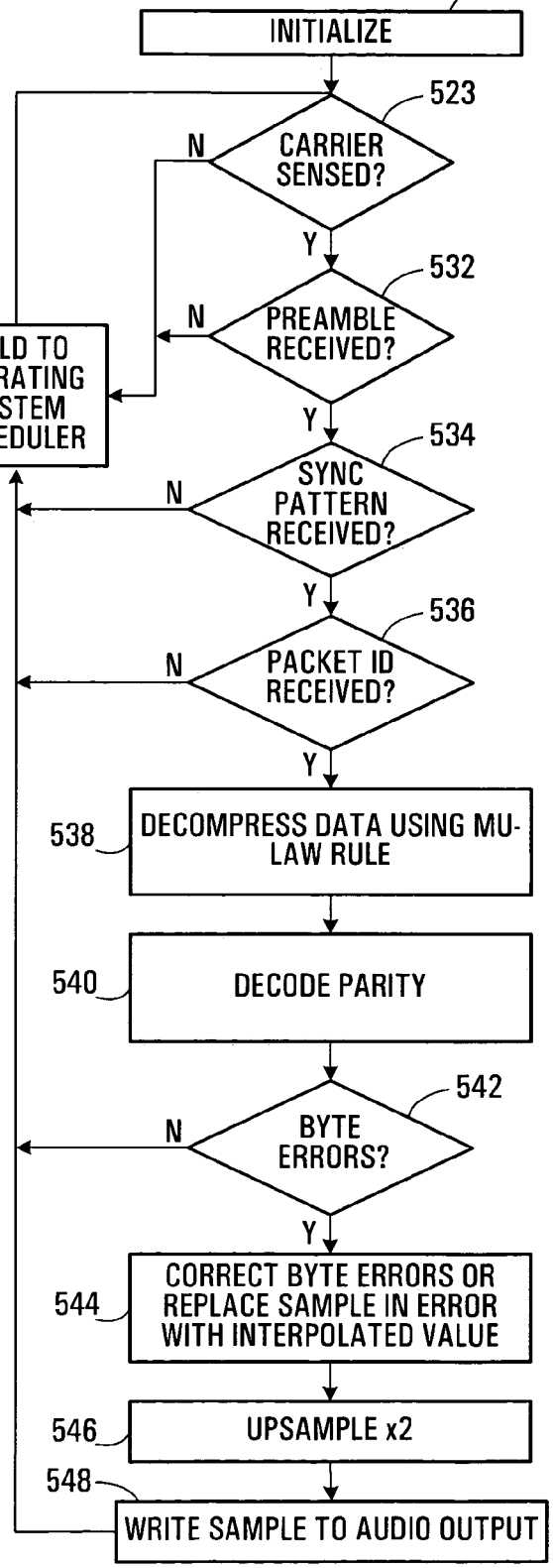
FIG. 21
FIG. 22

DUAL-BAND RADIO ENABLED LAPEL MOUNTED AUDIO AND SIGNAL HANDLING SYSTEM AND METHOD

BACKGROUND OF THE INVENTION

1. Field of Invention

This invention relates to radio communication apparatus and methods and more particularly to apparatus and methods facilitating the use and monitoring of multiple radio frequency channels.

2. Description of Related Art

Communication between wearers of self-contained breathing apparatus, such as face masks, for example, is extremely difficult even under the best conditions. Users must yell through their masks or use hand signals, or in some cases, even remove their masks, just to be able to communicate with each other. Communication among fire fighters, for example, can become almost impossible in a smoke-filled or fire engulfed area. Fire fighting often requires split-second decision making, often with serious consequences at stake, and thus communication between fire fighters is important.

Existing communication mechanisms typically employ a very high frequency (VHF) or ultra high frequency (UHF) radio connected to a microphone which is "push-to-talk" activated and coupled by a corded link to a speaker placed in proximity to a user's ear. This may provide a walkie-talkie type arrangement for single-channel communications. When using this type of system, a wearer of a self-contained breathing apparatus must push a button while speaking into the microphone, which requires the use of one hand, leaving only one hand free. Moreover, audio signals picked up by the microphone are usually amplified before transmission and often the microphone picks up interference in the form of ambient noise, such as the noise encountered in most fire situations for example. In addition, the geometry of a cavity inside the self-contained breathing apparatus can enhance low frequencies, making the wearer's voice virtually unintelligible when transmitted to a remote user. The cord connecting the microphone and speaker to the VHF or UHF radio can often frustrate a user as it can become entangled in the user's clothes or other equipment in use, or it may loosen and become detached. In short, the cord can be a safety hazard, which is of particular concern in the case of fire fighters.

Some existing mechanisms employ voice detection circuitry as an alternative to or in addition to the "push-to-talk" function. However, ambient noise interference can cause false triggering of the voice detection circuitry.

Existing mechanisms that permit a user to choose between "push-to-talk" operation and hands-free operation require that the user unplug a cable from one receptacle and plug the cable into another. There is not a seamless transition between "push-to-talk" operation and hands-free operation, which can be a problem as fire fighters suit up to attend a fire.

SUMMARY OF THE INVENTION

In accordance with one aspect of the invention, there is provided an apparatus for communicating using multiple channels. The apparatus includes a first radio receiver and a controller. The first radio receiver is configured to produce a first receive signal in response to a first radio frequency signal in a first frequency band. The controller has a first receive input for receiving the first receive signal, an audio input for receiving an audio in signal, a selector input for receiving a selector signal, an audio output for producing an audio out signal and a first transmitter output for producing a first transmitter signal. The first transmit output is configured for communication with a radio transmitter operable to transmit a second radio frequency signal in a second frequency band different from the first frequency band. The controller is configured to cause the audio output to produce the audio out signal in response to the first receive signal when the selector signal is in a first state and to cause the first transmitter output to produce the first transmit signal in response to the audio in signal when the selector signal is in a second state.

Producing the audio out signal may involve sampling the first receive signal to produce samples and communicating the samples to the audio output.

Producing the first transmit signal may involve receiving, at the first receive input, samples representing the first receive signal and communicating the samples to the first transmitter output.

The apparatus may further include a housing for housing the first radio receiver and the controller. The housing may be operable to be worn on a person.

The apparatus may further include a microphone in the housing, the microphone being operable to produce the audio signal.

The apparatus may further include a speaker in the housing, the speaker being operable to produce an audible representation of the audio out signal.

The apparatus may further include a selector signal generator on the housing for producing the selector signal. The selector signal generator may include a switch on the housing, the switch having an actuator on the housing to permit a user to control the selector signal.

The apparatus may further include an interface configured for communication with the first radio transmitter, the interface being in communication with the first transmit output.

The controller may be configured to communicate with the interface to detect whether or not communications can be established with the first radio transmitter. The interface may include a connector and the connector may be operable to receive a power signal from the first radio transmitter and the controller may be configured to detect the power signal to determine whether or not communications can be established with the first radio transmitter. The controller may be configured to cause the audio in signal to be communicated to the first transmit output when the controller determines that communications can be established with the first radio transmitter.

The controller may have a second receive input, for receiving a second receive signal from a second receiver. The controller may be configured to cause the audio out signal to be produced in response to the second receive signal when the energy of the second receive signal is greater than or equal to a threshold and the selector signal is in a first state and to cause the audio out signal to be produced in response to the first receive signal when the energy of the second receive signal is less than the threshold and the selector signal is in the first state.

The interface may be in communication with the second receive input.

The apparatus may further include the second receiver, the second receiver being in communication with the interface.

The apparatus may further include a first radio transceiver, the second receiver and the first transmitter being components of the first radio transceiver. The first radio transceiver may include a very high frequency (VHF) or ultra high frequency (UHF) radio and this may be a hand-held VHF or UHF radio.

The controller may be configured to cause the second receive signal to be amplified by a gain adjustable amplifier, and the controller may be configured to control the gain adjustable amplifier according to the energy of the second receive signal.

The controller may have a second transmit output for producing a second transmit signal in response to the audio in signal when the selector signal is in the second state.

The apparatus may further include a second radio frequency transmitter in communication with the second transmit output, the radio frequency transmitter being operable to produce a radio frequency transmit signal in response to the second transmit signal.

The radio frequency transmitter may be configured to produce the radio frequency transmit signal such that the radio frequency transmit signal has a frequency within the first frequency band.

The apparatus may further include a second radio transceiver, the first radio receiver and the second radio transmitter being components of the second radio transceiver, the second radio transceiver being operable to communicate with a remote radio transceiver.

The apparatus may further include a remote radio transceiver operable to communicate with the second radio transceiver, the remote radio transceiver being on a breathing apparatus.

The controller may be operable to communicate with the second radio transceiver to cause the second radio transceiver to receive radio frequency signals on a selected receive channel.

The apparatus may further include a user interface in communication with the controller and operable to receive user input indicating a desired receive channel change.

The controller may be configured to cause the second radio transceiver to communicate with the remote transceiver to cause the remote transceiver to transmit radio frequency signals on a selected transmit channel in the first frequency band.

The apparatus may further include a user interface in communication with the controller for receiving user input to facilitate selection of the transmit channel.

The controller may have a second transmit output for producing a second transmit signal in response to the audio signal when the selector signal is in the second state.

The apparatus may further include a second radio frequency transmitter in communication with the second transmit output, the second radio frequency transmitter being operable to produce a radio frequency transmit signal in response to the second transmit signal.

The radio frequency transmitter may be configured to produce the radio frequency transmit signal such that the radio frequency transmit signal has a frequency within the first frequency band.

The apparatus may further include a second radio transceiver, the first radio receiver and the second radio transmitter being components of the second radio transceiver, the second radio transceiver being operable to communicate with a remote radio transceiver.

The apparatus may further include a remote radio transceiver operable to communicate with the first radio transceiver, the second radio transceiver being on a breathing apparatus.

The controller may be operable to communicate with the second radio transceiver to cause the second radio transceiver to receive radio frequency signals on a selected receive channel.

The apparatus may further include a user interface in communication with the controller and operable to receive user input indicating a desired receive channel change.

The second radio transceiver may be operable to communicate with a remote transceiver operable to receive and transmit signals in the first frequency band and the controller may be configured to cause the second radio transceiver to communicate with the remote transceiver to cause the remote transceiver to transmit radio frequency signals on a selected transmit channel in the first frequency band.

The apparatus may further include a user interface in communication with the controller for receiving user input to facilitate selection of the transmit channel.

In accordance with another aspect of the invention, there is provided a method for communicating using multiple channels. The method involves producing a first receive signal in response to a first radio frequency signal in a first radio frequency band, receiving an audio in signal, selectively causing an audio output to produce an audio out signal in response to the first receive signal when a selector signal is in a first state and causing a first transmit output to produce a first transmit signal for use by a first transmitter, in response to the audio in signal, when the selector signal is in a second state.

Producing the audio out signal may involve sampling the first receive signal to produce samples and communicating the samples to the audio output.

Producing the first transmit signal may involve receiving, at the first receive input, samples representing the first receive signal and communicating the samples to the first transmitter output.

The method may involve housing the first radio receiver and the controller in a common housing. The housing may be worn on a person.

The method may involve producing the audio signal, and this may involve amplifying a signal produced by a microphone.

The method may involve emitting an audible representation of the audio out signal through a speaker in the housing.

The method may involve producing the selector signal and this may involve actuating an actuator on the housing, to permit a user to control a state of the selector signal.

The method may involve detecting whether or not communications can be established with the first radio transmitter. Detecting may involve receiving a power signal from the first radio transmitter and detecting whether or not the power signal is present.

The method may involve causing the audio in signal to be communicated to the first transmit output when the controller determines that communications can be established with the first radio transmitter.

The method may involve receiving a second receive signal from a second receiver. The method may involve producing the audio out signal in response to the second receive signal when the energy of the second receive signal is greater than or equal to a threshold and the selector signal is in a first state and producing the audio out signal in response to the first receive signal when the energy of the second receive signal is less than the threshold and the selector signal is in the first state.

The method may involve measuring the energy of the receive signal.

The method may involve controlling the gain of a gain-adjustable amplifier according to the energy of the second receive signal.

The method may involve producing a second transmit signal in response to the audio in signal when the selector signal is in the second state. The method may involve producing a radio frequency transmit signal in response to the second transmit signal.

Producing the radio frequency transmit signal may involve producing the radio frequency transmit signal such that the radio frequency transmit signal has a frequency within the first frequency band.

The method may involve communicating with a second radio transceiver to cause the second radio transceiver to receive radio frequency signals on a selected receive channel. The method may involve receiving user input indicating a desired receive channel change.

The method may involve communicating with a remote transceiver operable to receive and transmit signals in the first frequency band and causing the second radio transceiver to communicate with the remote transceiver to cause the remote transceiver to transmit radio frequency signals on a selected transmit channel in the first frequency band. The method may involve receiving user input to facilitate selection of the transmit channel.

The method may involve producing a second transmit signal in response to the audio signal when the selector signal is in the second state. The method may involve producing a radio frequency transmit signal in response to the second transmit signal. Producing the radio frequency transmit signal may involve producing the radio frequency transmit signal such that the radio frequency transmit signal has a frequency within the first frequency band.

The method may involve communicating with the first radio transceiver to cause the first radio transceiver to receive and transmit radio frequency signals on a selected receive channel. The method may involve receiving user input to facilitate selection of the receive channel.

In accordance with another aspect of the invention, there is provided an apparatus for communicating using multiple channels. The apparatus includes provisions for producing a first receive signal in response to a first radio frequency signal in a first radio frequency band. The apparatus also includes a processor circuit having a first receive input for receiving the first receive signal, an audio input for receiving an audio in signal, a selector input for receiving a selector signal, an audio output for producing an audio out signal and a first transmitter output for producing a first transmitter signal, the first transmit output being configured for communication with a radio transmitter operable to transmit a second radio frequency signal in a second frequency band different from the first frequency band and provisions for selectively causing the audio output to produce an audio out signal in response to the first receive signal when the selector signal is in a first state and causing a first transmit output to produce a first transmit signal for use by a first transmitter, in response to the audio in signal, when the selector signal is in a second state.

The processor circuit may be operable to sample the first receive signal to produce samples and to communicate the samples to the audio output.

The processor circuit may be operable to receive, at the first receive input, samples representing the first receive signal and to communicate the samples to the first transmitter output.

The provisions for selectively causing may include a computer readable medium encoded with codes for controlling the processor circuit.

The apparatus may further include provisions for housing the first radio receiver and the processor circuit. The apparatus may further include provisions for securing the housing on a person.

The apparatus may further include provisions for producing the audio signal.

The provisions for producing the audio signal may include a microphone.

The apparatus may further include a speaker in the provisions for housing, for emitting an audible representation of the audio out signal.

The apparatus may further include provisions for producing the selector signal.

The provisions for producing the selector signal may include a switch having an actuator on the housing provisions, to permit a user to control a state of the selector signal.

The apparatus may further include provisions for detecting whether or not communications can be established with the first radio transmitter.

The provisions for detecting may include provisions for receiving a power signal from the first radio transmitter and a computer readable medium encoded with codes for controlling the processor circuit to detect whether or not the power signal is being received from the first radio transmitter.

The apparatus may further include provisions for causing the audio in signal to be communicated to the first transmit output when the detecting provisions determine that communications can be established with the first radio transmitter.

The apparatus may further include provisions for receiving a second receive signal from a second receiver.

The apparatus may further include a computer readable medium encoded with codes for directing the processor circuit to produce the audio out signal in response to the second receive signal when the energy of the second receive signal is greater than or equal to a threshold and the selector signal is in a first state and for directing the processor circuit to produce the audio out signal in response to the first receive signal when the energy of the second receive signal is less than the threshold and the selector signal is in the first state.

The apparatus may further include provisions for measuring the energy of the receive signal.

The provisions for measuring the energy of the receive signal may include a computer readable medium encoded with codes for directing the processor circuit to compute an energy value of a sample of the receive signal.

The apparatus may further include provisions for amplifying the second receive signal in response to the energy of the second receive signal.

The apparatus may further include provisions for producing a second transmit signal in response to the audio in signal when the selector signal is in the second state.

The provisions for producing the second transmit signal may include a computer readable medium encoded with codes for directing the processor circuit to receive samples at the audio input and to communicate the samples to a second transmit output.

The apparatus may further include provisions for producing a radio frequency transmit signal in response to the second transmit signal.

The provisions for producing a radio frequency transmit signal may include a second radio frequency transceiver operable to transmit and receive radio frequency signals in the first frequency band.

The apparatus may further include provisions for communicating with the second radio transceiver to cause the second radio transceiver to receive radio frequency signals on a selected receive channel.

The provisions for communicating may include a computer readable medium encoded with codes for directing the processor circuit to communicate with the second radio transceiver to cause the second radio transceiver to receive radio frequency signals on the selected receive channel.

The apparatus may further include provisions for receiving user input indicating a desired receive channel change and these provisions may include a switch.

The apparatus may further include provisions for communicating with a remote transceiver operable to receive and transmit signals in the first frequency band and for causing the second radio transceiver to communicate with the remote transceiver to cause the remote transceiver to transmit radio frequency signals on a selected transmit channel in the first frequency band.

The provisions for communicating may include a computer readable medium encoded with codes for directing the processor circuit to communicate with the second transceiver to cause the second transceiver to communicate with the remote transceiver causing the remote transceiver to transmit radio frequency signals on a selected transmit channel in the first frequency band.

The apparatus may further include provisions for receiving user input to facilitate selection of the transmit channel and such provisions may include a switch.

In accordance with another aspect of the invention, there is provided a computer readable medium encoded with codes for directing a processor circuit to, when a selector signal received at the processor circuit is in a first state, cause an audio output of the processor circuit to produce an audio out signal in response to a first receive signal received at the processor circuit from a first radio signal receiver and when the selector signal is in a second state, cause a first transmit output of the processor circuit to produce a first transmit signal for use by a first transmitter, in response to an audio in signal received at the processor circuit.

The computer readable medium may include at least one of a memory device and a network port operable to provide a signal encoded with the codes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 14 is a flowchart of a second transceiver transmit channel change interrupt service routine executed by the processor circuit of the apparatus of FIG. 5;

FIG. 15 is a flowchart of a second transceiver transmit channel change routine executed by the processor circuit of the apparatus shown in FIG. 5;

FIG. 21 is a flowchart of a second transceiver receive interrupt service routine executed by the processor circuit of the apparatus shown in FIG. 5;

FIG. 22 is a flowchart of a second transceiver receive routine executed by the processor circuit of the apparatus shown in FIG. 5;

DETAILED DESCRIPTION

Figure 1:
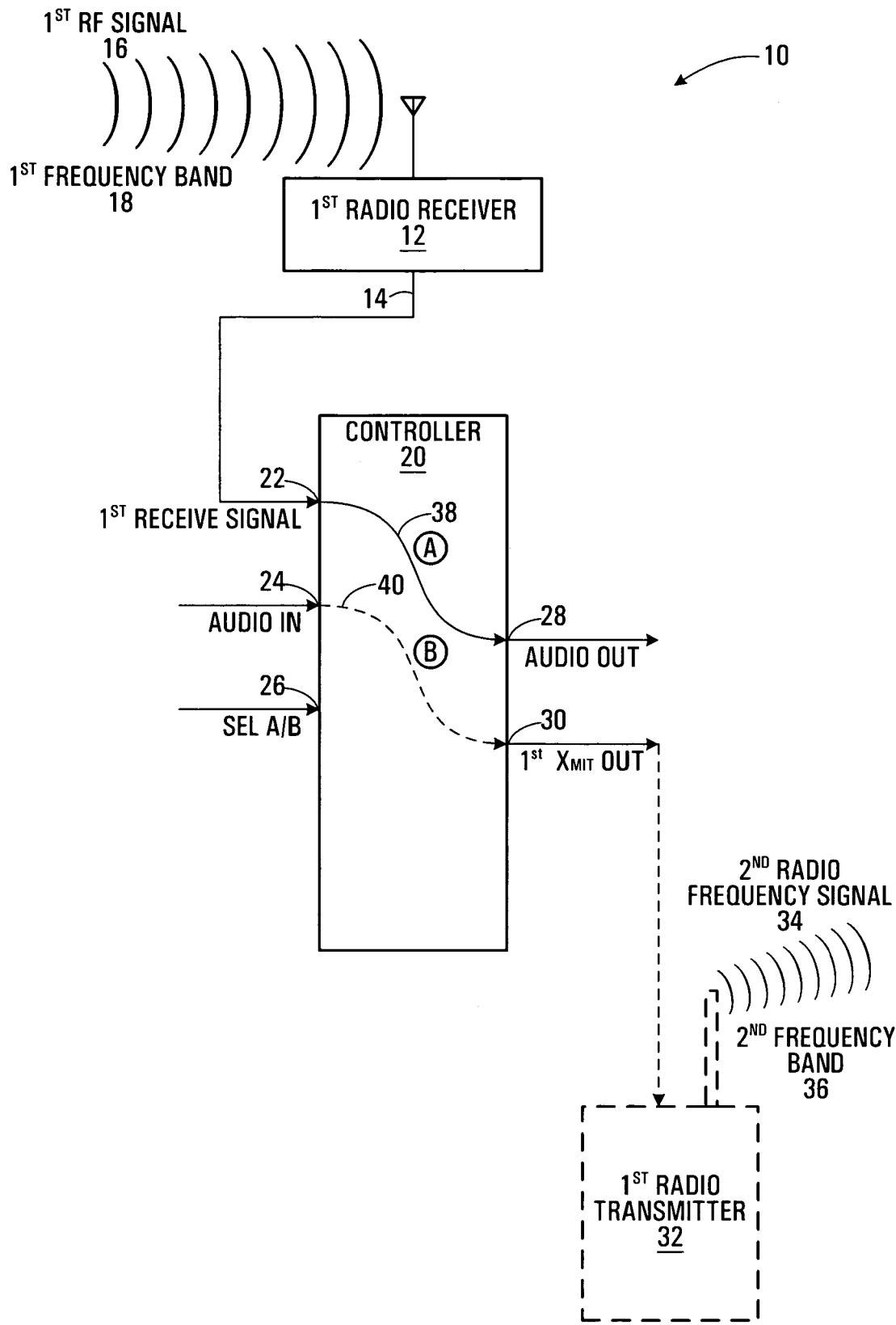
FIG. 1 is a block diagram of an apparatus according to a first embodiment of the invention.

Referring to FIG. 1, a communication apparatus according to a first embodiment of the invention is shown generally at 10. The apparatus 10 includes a first radio receiver 12 configured to produce a first receive signal on an output signal line 14 in response to a first radio frequency signal 16 in a first frequency band 18. The apparatus 10 further includes a controller 20 having a first receive input 22 for receiving the first receive signal, an audio input 24 for receiving an input audio signal, a selector input 26 for receiving a selector signal, an audio output 28 for producing an audio out signal and a first transmit output 30 for producing a first transmitter signal. The first transmit output 30 is configured for communication with a first radio transmitter shown generally at 32 operable to transmit a second radio frequency signal 34 in a second frequency band 36 different from the first frequency band 18.

The controller 20 is configured to selectively cause the audio output 28 to produce the audio out signal in response to the first receive signal received at the first receive input 22 when the selector signal received at the selector input 26 is in a first state and is further configured to cause the first transmit output 30 to produce the first transmit signal in response to the audio in signal received at the audio input 24 when the selector signal received at the selector input 26 is in a second state. Exemplary connection paths are indicated by circled letters A and B corresponding to two states of the selector signal received at the selector input 26. A first path 38 between the first receive input 22 and the audio output 28 is shown associated with the selector signal having a first state A and a second path 40 is shown in broken outline between the audio input 24 and the first transmit output 30 in association with a second state B of the selector signal. The input audio signal may be supplied by any audio apparatus, at a voltage level compatible with the controller. Such audio apparatus may include a microphone and preamplifier, for example, a wireless microphone system, a tape recorder, a digital audio recorder, a cd player, an MP3 player or any other audio source.

The audio output signal may be supplied to an audio amplifier and speaker located in proximity to the controller or remotely therefrom, for example. Alternatively, or in addition, the audio out signal may be supplied to an audio recorder, public address system and/or a broadcasting system, for example.

Figure 2:
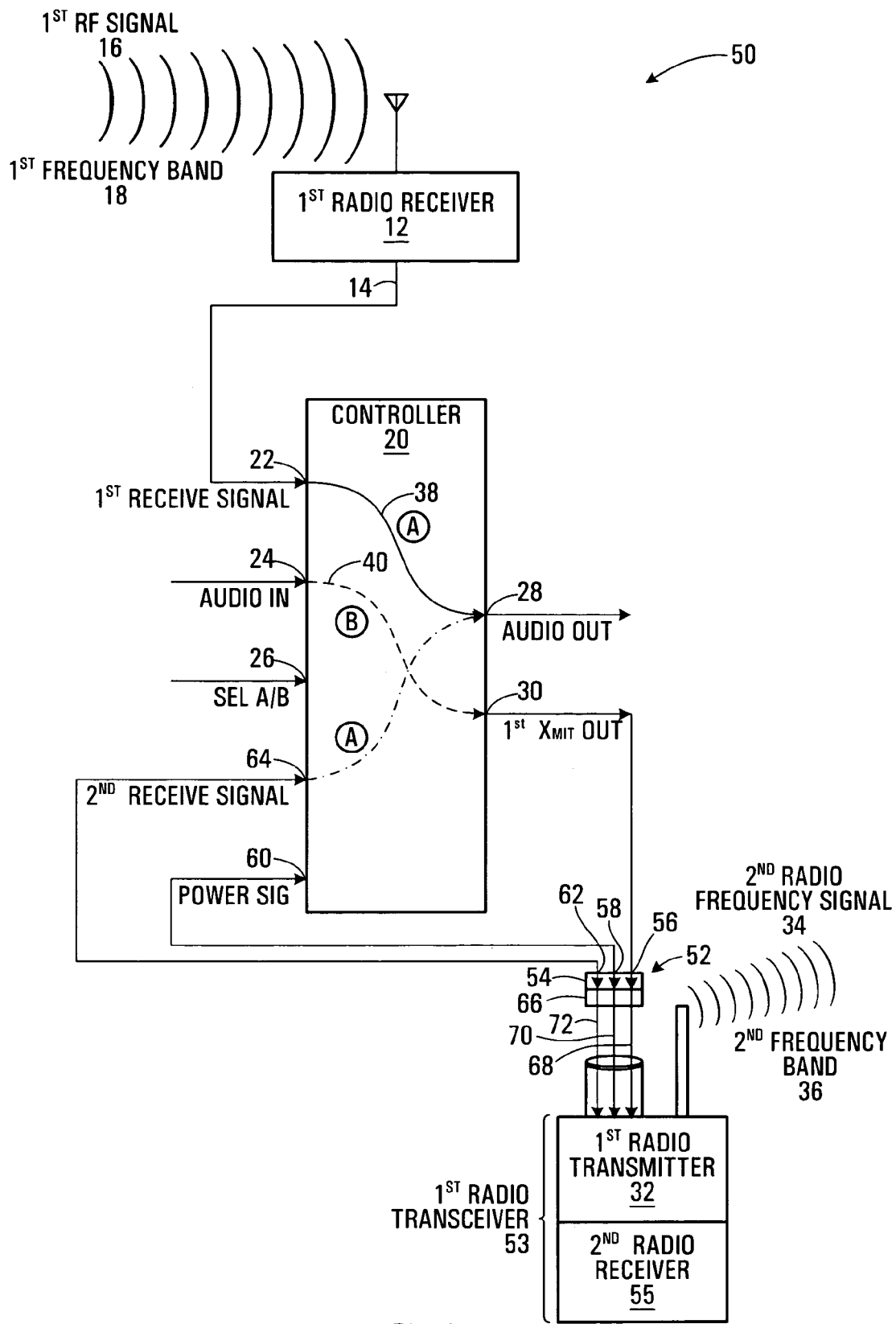
FIG. 2 is a block diagram of an apparatus according to a second embodiment of the invention.

Referring to FIG. 2, an apparatus according to an alternative embodiment of the invention is shown generally at 50. The apparatus of this embodiment includes the features of the previous embodiment and thus, like components are designated by the same numbers as corresponding components in the first embodiment. The apparatus of this embodiment further includes an interface 52 configured for communication with a first radio transceiver 53 that includes the first radio transmitter 32 and a second radio receiver 55, operable to transmit and receive radio frequency signals in the second frequency band 36.

The interface 52 may include a connector 54 having a contact 56 in communication with the first transmit output 30. The connector 54 may have a further contact 58 in communication with a power signal sense input 60 at the controller 20 and the connector 54 may further have another contact 62 in communication with a second receive input 64 of the controller 20. The connector 54 may be removably connectable to a complementary connector 66 having connections to an input signal line 68, a power signal line 70 and an audio output line 72 of the first radio transmitter 32. In this embodiment, the first radio transceiver produces a power signal on the power signal line 70. The power signal may simply include a signal directly from the power supply (not shown) of the first radio transceiver 53. In this embodiment, the controller 20 is configured to detect the power signal at the power signal sense input 60 of the controller 20. Detection of the power signal may be interpreted by the controller as determining that communications can be established with the first radio transmitter. The controller 20 may be configured to permit audio signals received at the audio input 24 to be communicated to the first transmit output 30 when it determines that such communications can be established. When it determines that communications cannot be established with the first radio transmitter 32, signals received at the audio input 24 are not communicated to the first transmit output 30.

When it is determined that such communications can be established with the first radio transmitter 32, in addition to providing the signal paths associated with selector signal states A and B in the first embodiment, the controller 20 provides a further signal path from the second receive input 64 to the audio output 28 causing signals received at the second receive input 64 to be communicated to the audio output 28, depending on the energy of the second receive signal and the state of the selector signal. For example, the controller may measure the energy of the second receive signal by sampling and squaring the sample value. When the energy of the second receive signal is greater than or equal to a threshold and the selector signal is in the first state, the audio out signal is produced in response to the second receive signal and when the energy of the second receive signal is less than the threshold and the selector signal is in the first state, the audio signal is produced in response to the first receive signal. In other words, while the selector signal is in the first state, a representation of signals received in the first frequency band is provided to the audio output 28 until a strong enough second receive signal is received from the first radio transceiver, representing a signal received in the second frequency band, in which case the second receive signal is provided to the audio output 28.

Figure 3:
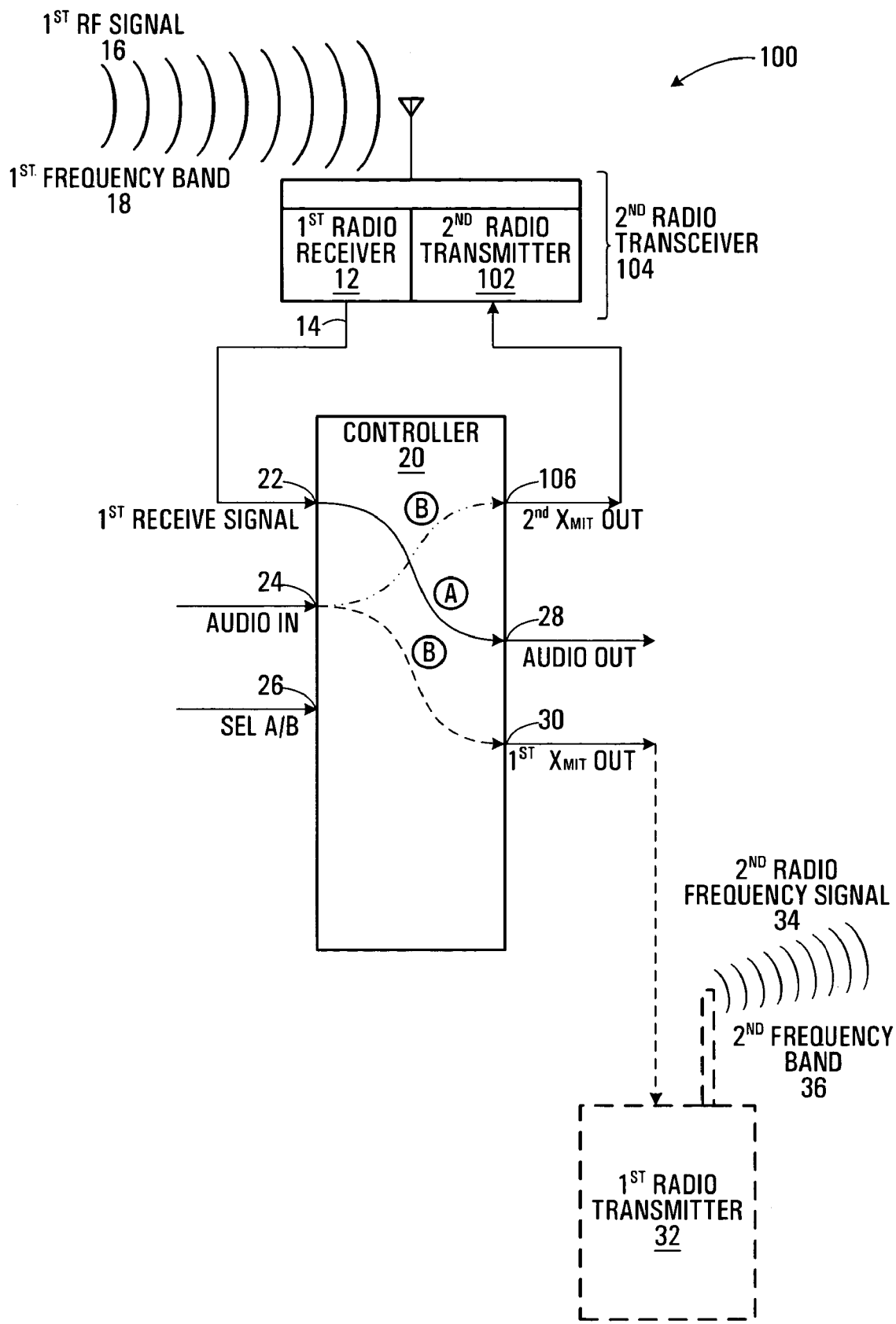
FIG. 3 is a block diagram of an apparatus according to a third embodiment of the invention.

Referring to FIG. 3 an apparatus according to a third embodiment of the invention is shown generally at 100. The apparatus of this embodiment includes the features of the first embodiment and thus, like components are designated by the same numbers as corresponding components in the first embodiment. The apparatus of this embodiment is similar to the first embodiment shown in FIG. 1, with the additional element of a second radio transmitter 102 operable to transmit signals in the first frequency band 18. The second radio transmitter 102 may be integrated along with the first radio receiver 12 into a second radio transceiver 104 operable to transmit and receive signals in the first frequency band 18. In addition, the controller 20 includes a second transmit output 106 for producing a second transmit signal in response to the audio signal received at the audio input 24 when the selector signal is in the second state. Producing the second transmit signal in response to the audio signal may occur in addition to or as an alternative to producing the first transmit signal in response to the audio signal when the selector signal is in the second state. This permits the audio signal to be broadcast in two different frequency bands, for example. One frequency band, such as the first frequency band may be devoted to short-range communications, while the second frequency band may be devoted to long-range communications, for example.

Figure 4:
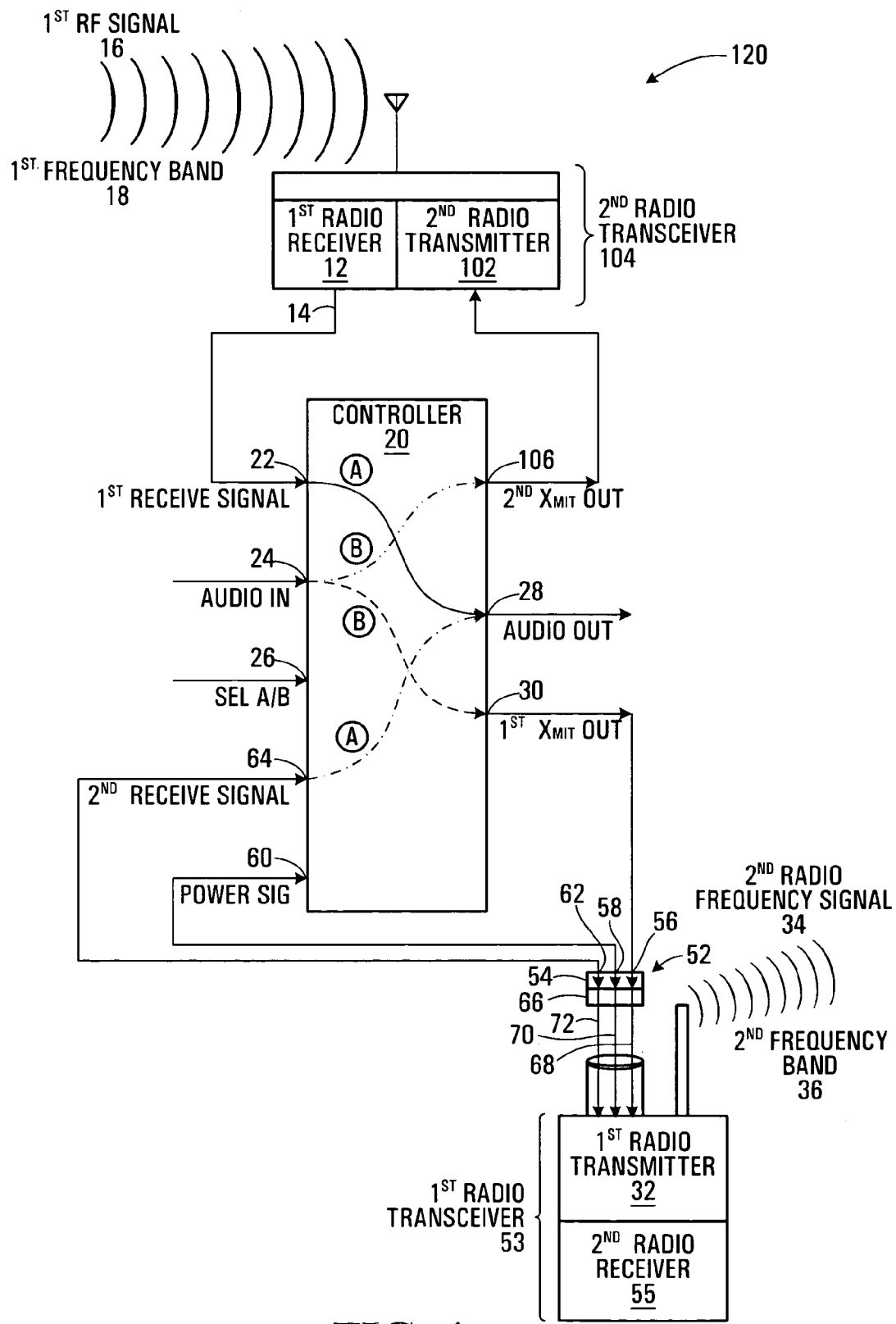
FIG. 4 is a block diagram of an apparatus according to a fourth embodiment of the invention.

Referring to FIG. 4, an apparatus according to a fourth embodiment of the invention is shown generally at 120. This embodiment combines the features of each of the previous three embodiments and thus, like components are designated by the same numbers as corresponding components in relevant ones of the first three embodiments. In general, when the selector signal received at the selector input 26 is in the first state (A) representations of signals received in the first frequency band 18 are provided to the audio output 28 unless the energy of the second receive signal representing a signal received in the second frequency band 36 meets or exceeds a threshold, in which case the representation of the signal received in the second frequency band 36 is provided to the audio output 28. When the selector signal is in the second state (B) the audio signal received at the audio input 24 is provided to both the first and second radio transmitters 32 and 102 causing the audio signal to be transmitted in both the first and second frequency bands 18 and 36.

Figure 5:
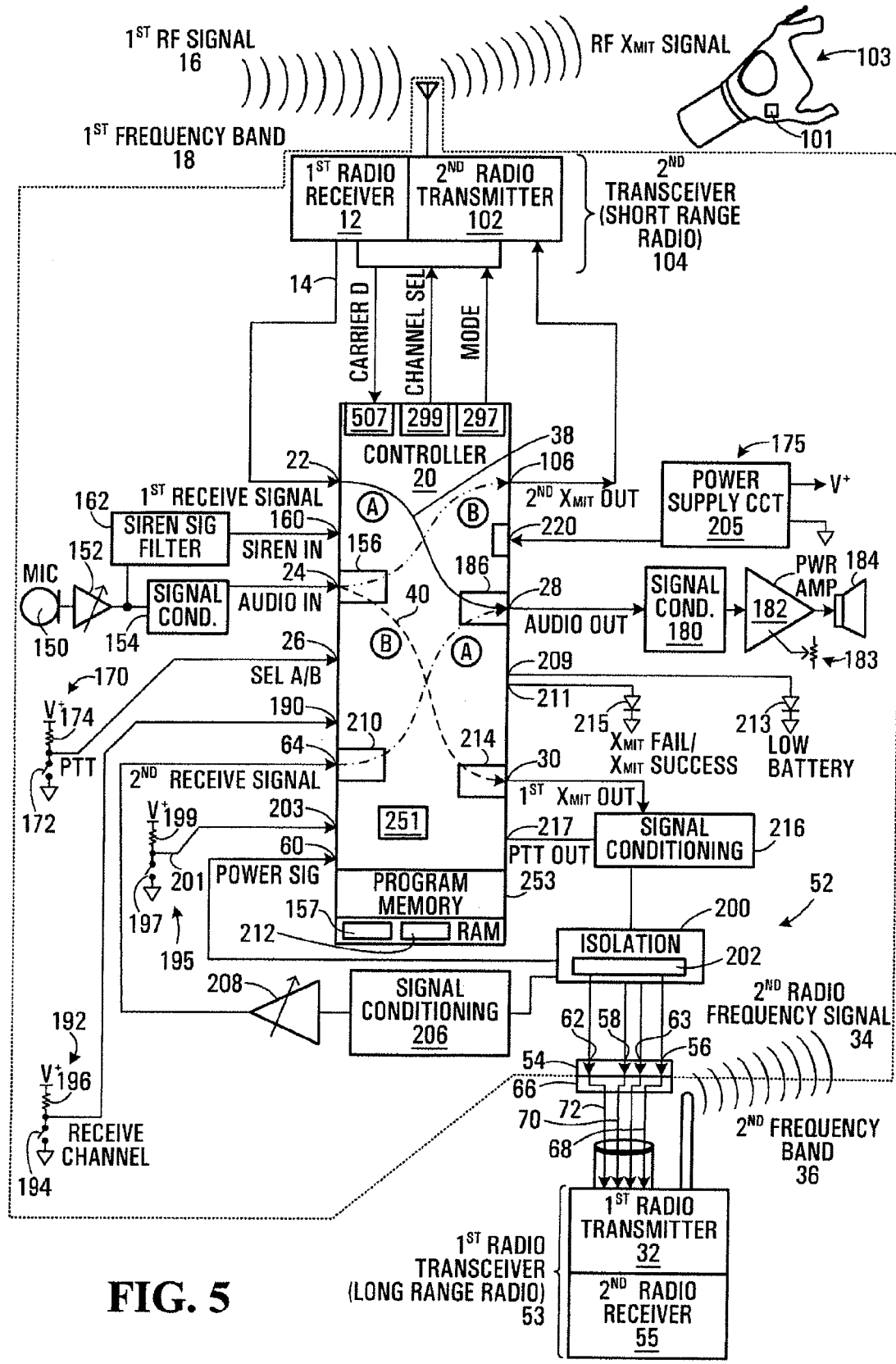
FIG. 5 is a block diagram of an apparatus according to a fifth embodiment to the invention.

Referring to FIG. 5, the embodiment shown in FIG. 4 is exemplified in use in a specific application for emergency personnel. Components shown in FIG. 4 are designated with the same numerical references in FIG. 5 and additional components specific to an emergency personnel application are shown, although these additional components may also be used in many other applications.

In this embodiment, signals received and transmitted in the first frequency band 18 may be short-range signals produced and received by a remote transceiver 101 mounted on a breathing apparatus such as a gas mask 103 worn by emergency personnel, for example. Such transceiver 101 may produce radio frequency transmit signals at a power of about 3 mW, for example, which is suitable for reception over a distance of about 200 ft. Transceivers of this type and for this application are described in Patent Cooperation Treaty application No. PCT/CA03/000796 which describes a communication system for a self-contained breathing apparatus comprising a plurality of short-range transceivers installed on gas masks worn by emergency personnel such as firefighters, and a plurality of short-range transceivers worn by the same personnel and connected to speakers, also worn by the same personnel, to provide for hands-free communications between such personnel when they are in relatively close proximity to each other.

In addition, in applying the technology described herein, in the emergency services use described above, the second frequency band 36 may be an ultra high frequency (UHF) band or a very high frequency (VHF) band such as is conventionally allocated and used by emergency personnel for coordination of firefighting efforts, for example. Hand-held UHF or VHF radios such as the Motorola HT 1000 manufactured by Motorola, are normally used for this purpose and have the capability of transmitting radio signals with a power of about 5W, which provides for relatively long-range communications compared to the relatively short-range communications provided by the transceivers operating in the first frequency band 18.

In the embodiment shown, the controller includes an MSP430 microcontroller available from Texas Instruments. The second radio transceiver 104 may be provided by a CC1020 single chip narrow band RF transceiver available from Chipcon AS of Oslo, Norway, for example.

Microphone

In addition to the components described in FIG. 4, the apparatus shown in FIG. 5 further includes a microphone 150, a variable gain amplifier 152, and a signal conditioning circuit 154. The microphone 150 may include a small electret condenser microphone operable to provide a microphone signal to the variable gain amplifier 152. The variable gain amplifier 152 may be controlled by the controller 20 to provide an automatic level control to increase and decrease the gain of the variable gain amplifier as required, to provide an amplified microphone signal of relatively constant level to the signal conditioning circuit 154. The signal conditioning circuit 154 provides bandpass filtering to limit the frequency spectrum of the amplified microphone signal to a range in which most speech energy is contained. The frequency range may be about 300 Hz to 3 kHz, for example. The signal conditioning circuit 154 produces a conditioned microphone signal to the audio input 24. The controller 20 has a built-in analog to digital converter 156 that converts the conditioned microphone signal into a digital format comprising a plurality of samples. These samples are stored in a first, first-in first-out (FIFO) buffer 157 established in an integral random access memory (RAM) 158 of the controller 20. The FIFO buffer 157 need only be deep enough to store a few samples, but not enough samples that would result in a perceptible delay.

Man-down

Optionally, the controller 20 may further include a sense input 160. A siren signal filter 162 may also be included and connected to the variable gain amplifier 152 to receive part of the amplified microphone signal and subject it to a high-Q bandpass filter centred on a frequency of a siren signal produced by a man-down signalling apparatus worn by emergency personnel. This apparatus normally produces a shrill audible sound having a frequency within a range of about 1-4 kHz when a person wearing the man-down signalling apparatus stops moving for more than a specified time, such as 30 seconds. The siren signal filter 162 produces a man-down signal which is received at the sense input 160 to indicate to the controller 20 whether or not a man-down siren signal has been detected. The controller 20 may respond by causing a pre-defined signal to be transmitted by the first and/or second radio transmitters 32 and 104 to alert emergency personnel of the man down condition. An associated audio out signal may also or alternatively be produced at the audio output 28.

Selector Signal—push to Talk

The apparatus shown in FIG. 5 further includes a selector signal generator shown generally at 170, for producing the selector signal received at the selector input 26. In this embodiment, the selector signal generator 170 includes a switch 172 and a resistor 174 in series and connected to a power supply circuit 175 to produce the selector signal in response to closing and opening the switch. The switch 172 may be a momentary, normally open switch, for example. The selector signal is in a first state A (high voltage) when the switch 172 is in its unactuated position and in a second state (low voltage) B when the switch 172 is in the actuated position. As described above, when the switch 172 is in the second state (B), the audio signal received at the audio input 24 is communicated to the first and second transmit outputs 30 and 106. Thus the switch 172 acts as a push-to-talk switch.

Speaker

The apparatus shown in FIG. 5 further includes an audio output signal conditioning circuit 180, a variable-gain power amplifier 182 controlled by a volume control 183 and a speaker 184. In the embodiment shown the controller 20 has a digital to analog converter 186 which converts digital samples received from the FIFO buffer 157 in RAM 158 into voltage levels appearing at the audio output 28. The output signal conditioning circuit 180 receives the audio out signal from the audio output 28 and filters the audio out signal to remove high frequency content resulting from sampling and produces a filtered audio out signal. The filtered audio out signal is provided to the power amplifier 182 which amplifies the filtered audio out signal to a level determined by the volume control 183 to drive the speaker 184 so that an audio version of the audio out signal produced by the audio output 28 can be heard by people in reasonable proximity to the speaker 184.

Receive Channel Selector

In this embodiment, the controller 20 further includes a channel selection input 190 and a channel selection signal generator 192. The channel selection signal generator 192 may include a switch 194 and a resistor 196 in series and connected to the power supply circuit 175 such that actuation of the switch 194 changes the voltage of the signal appearing at the channel selection input 190. The switch 194 may be a rotary switch, for example, with a plurality of detent positions, and configured such that on moving an actuator of the switch from one detent position to a successive one the voltage appearing at the channel selection input 190 changes from high to low and back to high. The channel selection input 190 may be positive edge-sensitive, for example, thereby detecting each time the switch actuator is moved to a successive detent position. The controller 20 may be programmed as will be described below, to change a receive channel of the second radio transceiver 104 in response to changes in detent position of the switch actuator, to enable a user to select a suitable channel (carrier frequency) within the first frequency band 18 for reception of short-range communications. This facilitates selection of channels in the event that one or more available channels is unable to permit an acceptable signal to noise ratio to be achieved.

Transmit Channel Changer

In addition, the apparatus includes a transmit channel changer shown generally at 195. The transmit channel changer 195 includes a normally open momentary switch 197 connected in series with a resistor 199 connected to the power supply circuit 175. A transmit channel change signal line 201 is connected between the switch 197 and a transmit channel change input 203 on the controller 20 and changes state in response to actuation of the switch 197. As described below, the controller 20 is responsive to the transmit channel change signal to effect a change in the transmit channel of the remote transceiver 101 in response to user-actuation of the switch 197 by activating a mode output 297 and a channel select output 299.

Battery Monitor

The power supply circuit 175 may include a battery (not shown) and in this embodiment a step-down converter 205 such as a Texas Instruments TPS62050DGS adjustable step down converter. The converter 205 produces a "power good" signal, and in the embodiment shown, this "power good" signal is communicated to a power sense input 220 of the controller 20, to permit the controller to monitor the power supply to be notified of an impending loss of power as determined by the converter 205.

Status Indicators

The controller 20 further includes outputs 209 and 211 which are used to control actuation of first and second indicators 213 and 215. In this embodiment the indicators include light emitting diodes, for example. The first indicator 213 may be controlled by the controller 20 to indicate a low battery condition, in response to receipt of an inactive power good signal from the converter 205, for example. The second indicator 215 may be controlled by the controller 20 to indicate a transmit channel change failure or success resulting from actuation of the transmit channel change switch 197, for example.

First Transceiver Push to Talk Signal

The controller 20 further includes a push to talk signal output 217 in communication with the first radio transceiver 53 through the interface 52, to enable the controller 20 to provide an output push to talk signal to the first radio transceiver 53 to cause the first radio transceiver to enter a transmit mode, permitting transmission of the signal received on the input signal line 68. The interface 52 may thus include a further contact 63 to which the output push to talk signal may be provided for communication to the first radio transceiver 53.

Isolation Circuit

Figure 6:
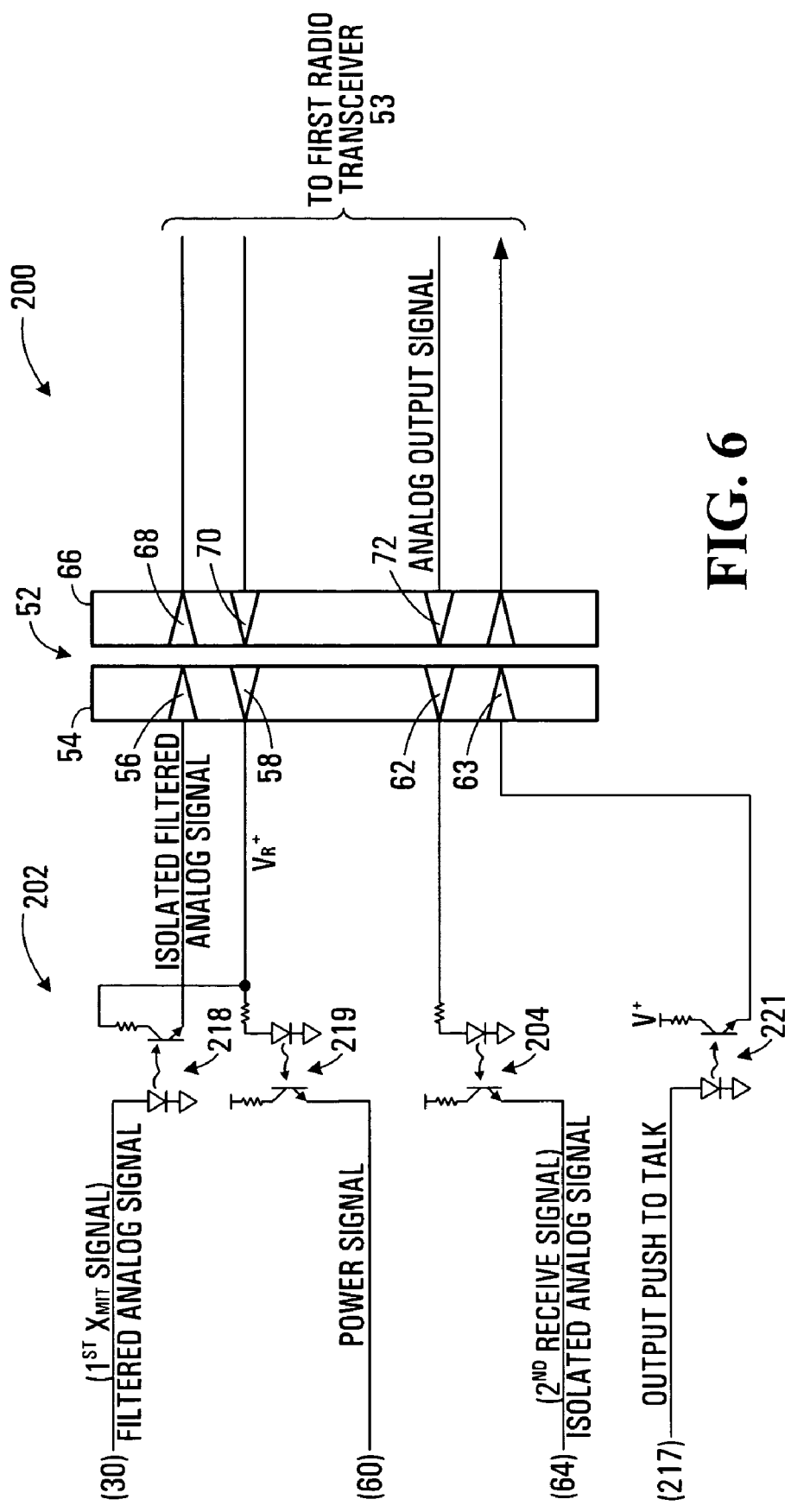
FIG. 6 is a schematic representation of an isolation circuit employed in the apparatus shown in FIG. 5.

Also, in the apparatus shown in FIG. 5, an isolation circuit 200 is provided between the first radio transceiver 53 and the controller 20. Referring to FIG. 6, the isolation circuit 200 may include opto isolators shown generally at 202 for example, to isolate signals originating at the first radio transceiver 53 from the controller (20) and to isolate signals originating at the controller (20) from the first radio transceiver 53. This isolation circuit 200 may be considered to form part of the interface 52 between the controller (20) and the first radio transceiver 53.

The isolation circuit 200 may be connected directly to the contacts, 56, 58, 62 and 63 for example. In this embodiment, the isolation circuit 200 includes a first isolation component 219, which includes a digital opto-isolator driven by the power signal on the power signal line 70 of the first radio transceiver 53. The first isolation component 219 produces the power signal received at the power signal sense input 60 of the controller 20 shown in FIG. 5 in response to the power signal on the power signal line 70. The isolation circuit 200 further includes a linear isolation component 204 operable to produce an isolated analog signal in response to an analog output signal produced by the first radio transceiver 53 on the audio output line 72. Referring back to FIG. 5, the isolated analog signal is provided to a signal conditioning circuit 206 which provides bandpass filtering to limit the frequency spectrum of the isolated analog signal to a range in which most speech energy is contained. As described above, the frequency range may be about 300 Hz to 3 kHz, for example. The signal conditioning circuit 206 produces a conditioned second receiver signal to a variable gain amplifier 208. The variable gain amplifier 208 may be controlled by the controller 20 to provide an automatic level control to increase and decrease the gain of the variable gain amplifier to provide an amplified second receive signal of relatively constant level to the second receive input 64. The controller 20 has a built-in analog to digital converter 210 that converts the conditioned second receiver signal into a digital format comprising a plurality of samples which are stored in a second FIFO buffer 212 in the built-in random access memory (RAM) 158 of the controller 20.

The controller 20 further includes a digital to analog converter 214 in communication with the first transmit output 30 for receiving samples from the first FIFO buffer 157 in the RAM 158 and for producing at the first transmit output 30 a signal having a voltage that varies in response to the samples. The apparatus further includes a third signal conditioning circuit 216 in communication with the first transmit output 30 and operable to produce a filtered analog signal representing the signal produced at the first transmit output 30. Referring to FIG. 6, this filtered analog signal from the first transmit output 30 is provided to a linear isolation component 218 that produces an isolated filtered analog signal that is provided to the contact 56 on the connector 54 for communication to the input signal line 68 of the first radio transceiver 53.

The isolation circuit 200 further includes another digital opto-isolator 221 for isolating the output push to talk signal produced at output 217 of the controller 20 from the first radio transceiver 53.

Housing

Before proceeding with a detailed functional description of the interaction between the components described above, it may be useful to point out that all components, including the controller 20 and the first and second radio transceivers 53 and 104 may be housed within the same housing. However, the use of the interface 52 between the controller 20 and the first radio transceiver 53 facilitates voluntary connection and disconnection of the first radio transceiver 53 and this may be particularly desirable in the emergency services use described above where the first transceiver is a conventional hand-held UHF or VHF transceiver. The interface 52 allows the use of hand-held UHF or VHF transceivers as the first radio transceiver 53, thereby enabling the apparatus to be used with existing UHF or VHF equipment normally already part of emergency services inventory. In this regard, it may be useful for the second radio transceiver 104 and the controller 20 and ancillary components to be housed within a single unitary housing such as shown at 250 in FIG. 7. The housing 250 may be shaped like a conventional hand-held microphone often used with rack or dashboard mounted VHF transceivers, for example and may have a clip (not shown) for connecting the housing to clothing so that it may be worn by emergency services person, for example. It may be worn on a lapel, near a shoulder of the person, for example. In this embodiment, the housing 250 has an upper front portion 252 with openings 254 behind which the speaker 184 may be. mounted and a lower front portion 256 behind which the microphone 150 may be mounted.

An actuator 258 of the selector switch 172 may be conveniently positioned on a side 260 of the housing 250 to facilitate actuation simply by squeezing a hand around the housing when one desires to transmit sounds uttered into the microphone 150.

An actuator 262 of the channel selector switch 194 may be positioned on a top surface 264 of the housing 250. An antenna mount 266 may be provided adjacent the actuator 262, for example, to facilitate mounting of a stub antenna, not shown, for transmitting signals in the first frequency band 18. The volume control 183 may also be provided adjacent the actuator 262 to provide for adjustment of the volume of sound produced by the speaker 184, for example. A transmit channel change switch actuator 267, mechanically connected to the transmit channel changer switch 197 may be mounted on an upper portion of the housing 250 or on the rear of the housing, for example. The first and second indicators 213 and 215 may be mounted on the housing 250 in a readily visible location. Other indicators may be provided to indicate on/off status, or other conditions, for example. It will be appreciated that the specific locations of the channel selector switch actuator 262, antenna mount 266 and volume control 268 are optional and may be determined by ergonomic considerations associated with the specific use of the apparatus.

In the embodiment shown, the housing 250 has a bottom portion 272 in which the connector 54 is mounted. The complementary connector 66, associated with the first radio transceiver 53 is shown connected to the first connector 54 as it would be seen if the first radio transceiver 53 were connected to the apparatus. It will be appreciated that connectors 54 and 66 may be separated, if desired.

Referring back to FIG. 5, the functionality of the apparatus will now be described.

The components described in connection with FIG. 5 generally facilitate communication to and from the controller 20 various control or audio signals. Responses to control signals and manipulation of audio signals is controlled by the controller 20 in response to instructions encoded in an integral program memory 253 of the controller. Alternatively, the controller 20 may communicate with external program memory (not shown) in which the instructions are encoded. The controller 20 may have a communications interface (not shown) or a media interface (not shown) to facilitate communication of these encoded instructions to the program memory 253, whether it is internal or external. Alternatively, the program memory 253 may be pre-encoded with these instructions. In general, the encoded instructions may be communicated to the program memory 253 through the communications interface or media interface by a computer readable signal encoded with said instructions or may be provided already encoded in a computer readable medium such as the program memory 253 itself or in a computer readable medium readable by the media interface operable to produce the computer readable signal. The computer readable medium may be a memory device or a network port operable to provide a signal encoded with codes defining the instructions for example.

In any event, the encoded instructions include functional content that is operable to cause a processor circuit 251 of the controller 20 to carry out certain functional operations. In general, blocks of code direct the processor circuit 251 to execute associated functional operations. Exemplary functionality produced by these blocks of code is depicted by corresponding blocks in the flowcharts appearing in FIGS. 8-24.

It will be appreciated by those skilled in the art that the MSP430 controller described herein as exemplifying the controller 20 may be substituted with other devices such as other types or brands of controllers, microprocessors, and/or computers including a processor circuit and/or may be substituted with distributed processing systems involving one or more processor circuits. Consequently, the term "processor circuit" used herein is meant to encompass any circuit that is capable of performing the functions described herein in response to encoded instructions.

Figure 8:
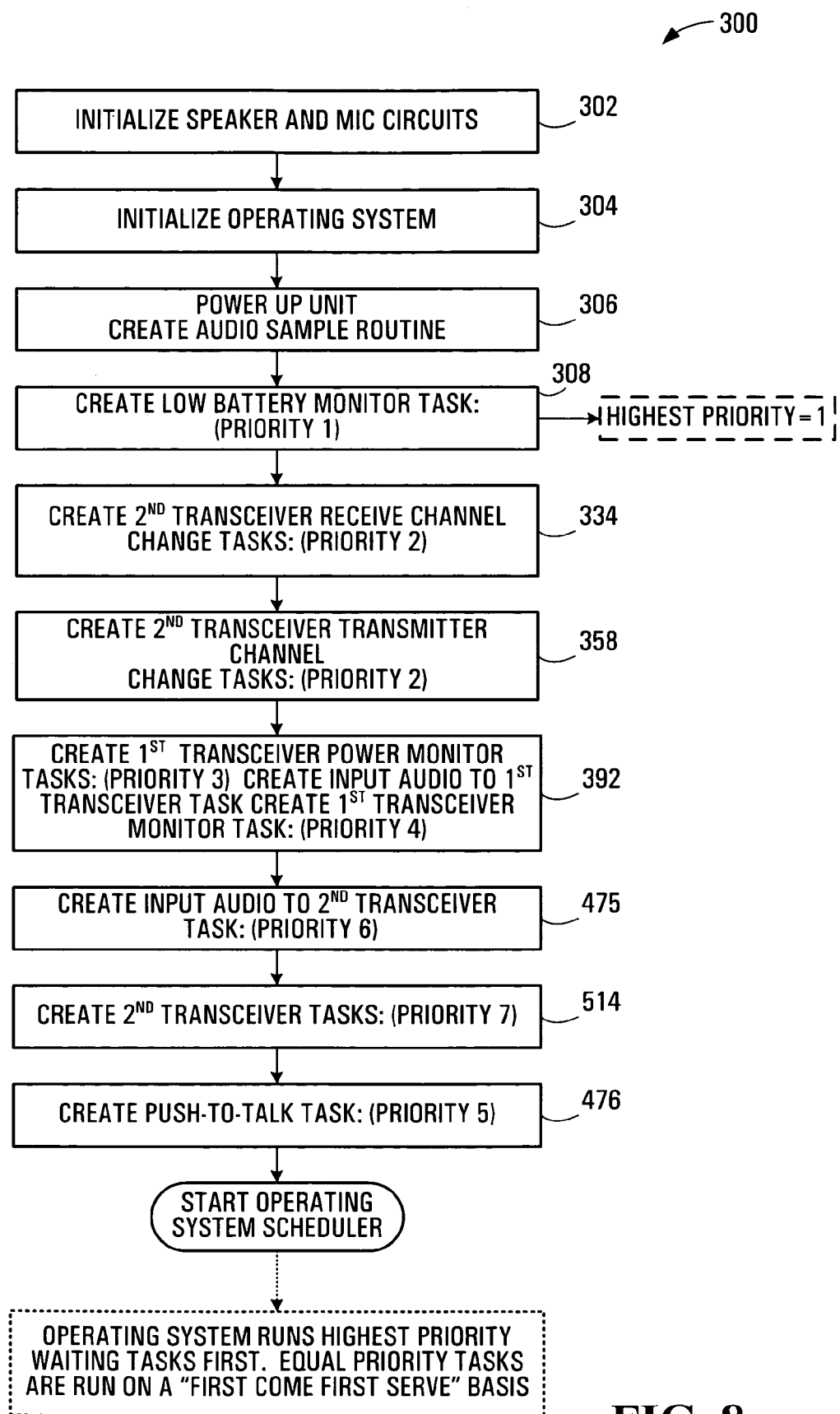
FIG. 8 is a high level flowchart illustrating tasks created for controlling a processor circuit of the apparatus shown in FIG. 5.

Referring to FIG. 8, on powering up the controller 20 shown in FIG. 5, the processor circuit 251 is directed to initialize the circuitry connected thereto, to load an operating system from the program memory 50 and to load the various blocks of code representing prioritized tasks that cooperate with the operating system to execute the functionality described below. In the embodiment shown, the operating system is of the multi-tasking type, permitting the establishment of multiple threads, some of which may be suspended pending receipt of a message in an event queue established by the operating system. The operating system includes an operating system scheduler that is operable to receive event messages from any active tasks and to schedule corresponding events according to relative priority.

Referring to FIGS. 5 and 8, initialization and task installation functions are shown generally at 300 and include a first speaker and mic unit initialization block that directs the processor circuit 251 to shut off the variable gain amplifiers 152 and 182 associated with the microphone 150 and speaker 184 respectively. Block 304 then directs the processor circuit 251 to initialize the operating system and block 306 directs the processor circuit 251 to power up the circuitry in an orderly manner. This may involve setting chip select signals (not shown) to an active state, for example. Block 306 also directs the processor circuit 251 to start an audio sample routine as shown in FIG. 9.

Audio Sample Routine

Figure 9:
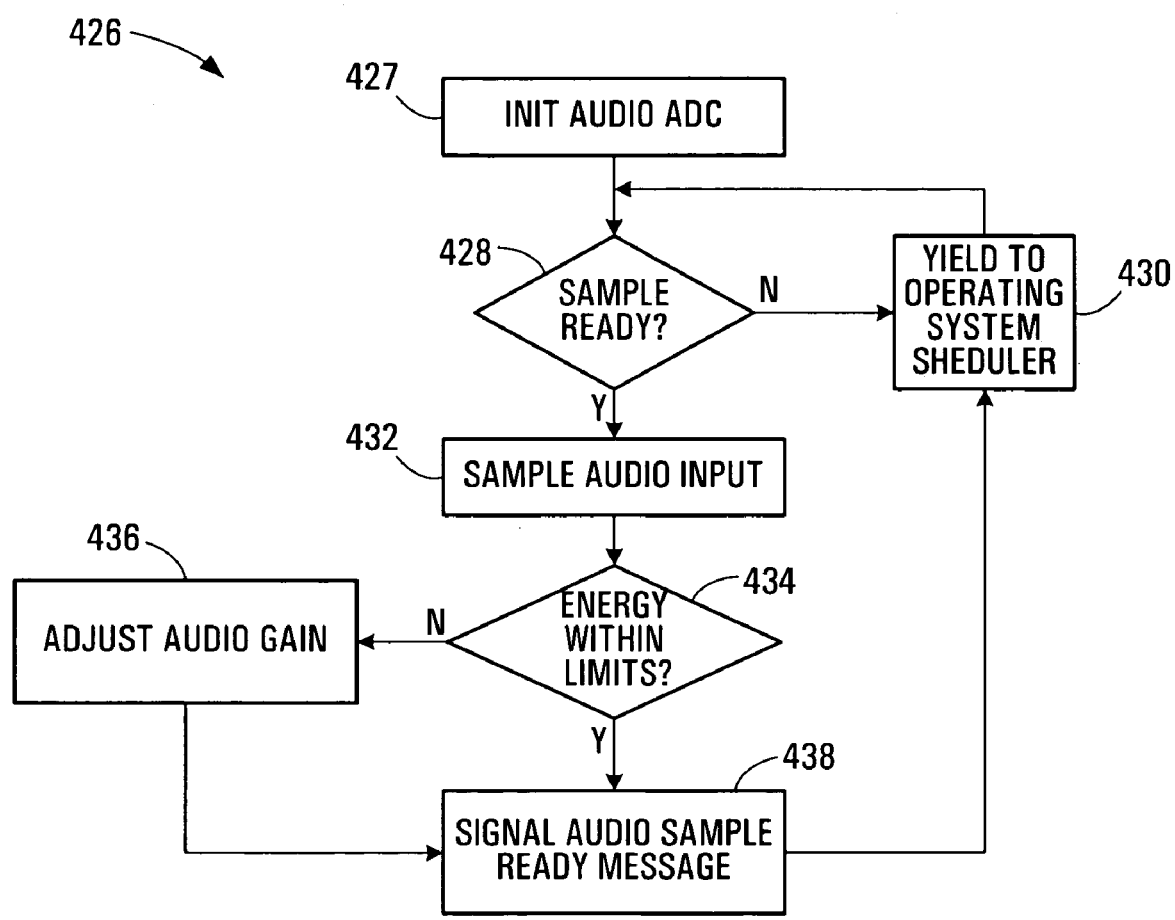
FIG. 9 is a flowchart of an audio sample routine executed by the processor circuit of the apparatus shown in of FIG. 5.

Referring to FIG. 9, the audio sample routine is shown generally at 426 and functions to store audio samples in the FIFO buffer 157 and to produce a microphone sample ready message. This routine 426 runs continuously and begins with an initialization block 428 that initializes the FIFO buffer 157 and initiates sampling by the analog to digital converter 156 in communication with the audio input 24. The analog to digital converter 156 produces an internal signal which indicates whether or not a sample is ready. Block 428 directs the processor circuit 251 to monitor this internal signal to determine when a sample is ready. Until a sample is ready, block 430 directs the processor circuit 251 to yield to the operating system scheduler. When a sample is ready, block 432 directs the processor circuit 251 to store the sample in the FIFO buffer 157. Block 434 then directs the processor circuit 251 to calculate the energy in the sample, such as by squaring the sample amplitude value and then determine whether or not the energy contained by the sample is within certain limits and if not, block 436 directs the processor circuit to adjust the gain of the variable gain amplifier 152 so that the next sample received will hopefully, be within the desired limits.

If at block 434, the energy of the sample is found to be within desired limits or if the audio gain has been adjusted at block 436, block 438 directs the processor circuit 251 to send the microphone sample ready message to the event queue for use by the microphone audio to long-range radio task shown in FIG. 17, or for use by other tasks as will be described below. After sending the microphone sample ready message to the event queue, the processor circuit 251 is directed back to the operating system scheduler as shown at block 430 in FIG. 9. In effect, the process shown in FIG. 9 directs the processor circuit to load the FIFO buffer 157 in the RAM 158 and to adjust the gain of the variable gain amplifier 152 to effect compression or emphasis of the dynamic range of the audio signal to be provided to the audio input 24, to attempt to maintain the input audio signal level at an optimum value.

Low Battery Monitor

Figure 10:
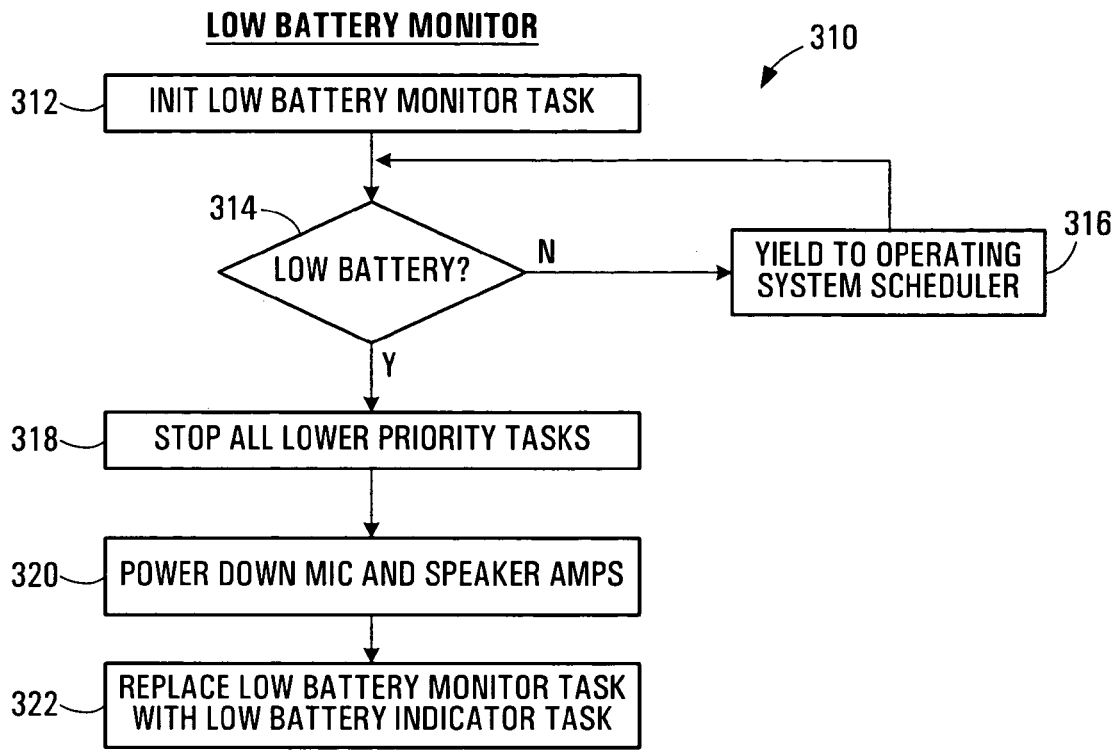
FIG. 10 is a flowchart illustrating a low battery monitor task executed by the processor circuit of the apparatus shown in FIG. 5.

Referring back to FIG. 8, block 308 then directs the processor circuit 251 to create a low battery monitor task as shown at 310 in FIG. 10. In the embodiment shown, the low battery monitor task has highest priority (priority 1) over all other tasks.

Referring to FIG. 10, the low battery monitor task begins with an initialization block 312 which directs the processor circuit 251 to initiate any variables associated with this routine. Block 314 then directs the processor circuit 251 to poll the low battery input 220 to determine whether the power supply circuit 175 indicates that a low battery condition exists. If a low battery condition does not exist, block 316 directs the processor circuit 251 to attend to the next highest priority task in the event queue.

Still referring to FIG. 10, if a low battery condition is detected, block 318 directs the processor circuit 251 to stop all lower priority tasks and then block 320 directs the processor circuit 251 to shut off the variable gain amplifiers 152 and 182 associated with the microphone 150 and speaker 184 respectively. Block 322 then directs the processor circuit 251 to replace the low battery monitor task with a low battery indicator task as shown in FIG. 11.

Low Battery Indicator

Figure 11:
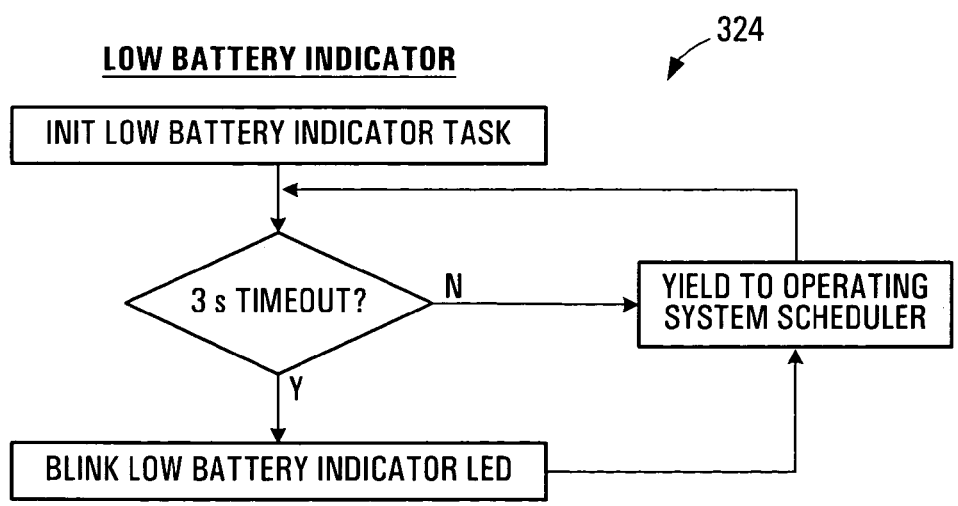
FIG. 11 is a flowchart of a low battery indicator task executed by the processor circuit of the apparatus shown in FIG. 5.

Referring to FIG. 11, the low battery indicator task 324 includes a first block 326 that directs the processor circuit 251 to initialize any variables associated with the low battery indicator task. Block 328 then directs the processor circuit 251 to wait for 3 seconds and on the expiry of 3 seconds, block 330 directs the processor circuit 251 to toggle the low battery indicator LED after the low battery indicator LED has been toggled and in the period before the 3 second timeout, block 332 directs the processor circuit 251 to attend to the next highest priority task in the event queue.

Second Transceiver Receive Channel Chance Tasks

Figures 12, 13:
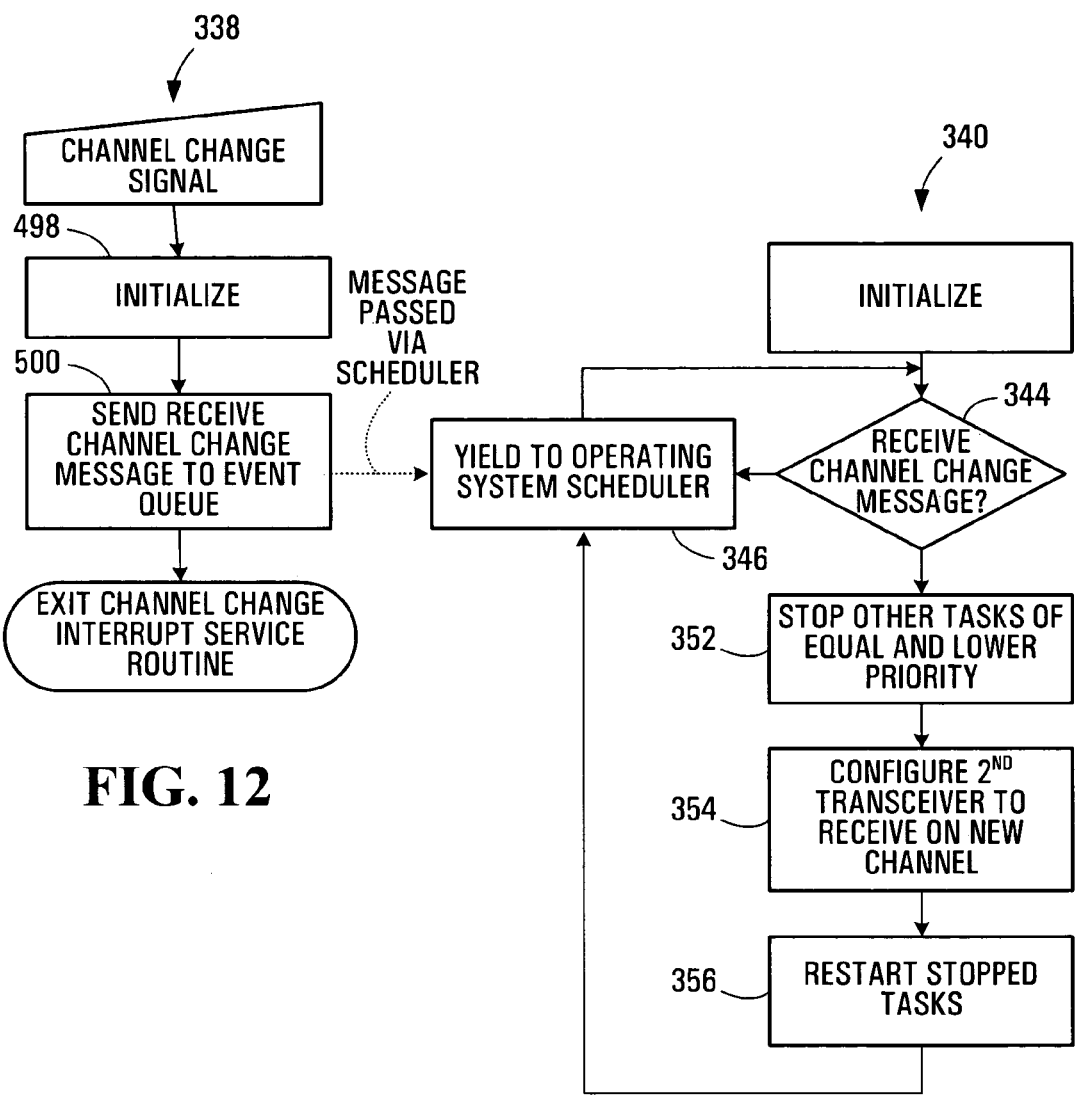
FIG. 12 is a flowchart of a second transceiver receive channel change interrupt service routine executed by the processor circuit of the apparatus shown in FIG. 5.
FIG. 13 is a flowchart of a second transceiver receive channel change routine executed by the processor circuit of the apparatus shown in FIG. 5.

Referring back to FIG. 8, after the low battery monitor task has been created at block 308, block 334 directs the processor circuit 251 to create receive channel change tasks having a priority of 2 and including a receive channel change interrupt service routine as shown generally at 338 in FIG. 12 and a corresponding receive channel change routine as shown generally at 340 in FIG. 13. On establishing the receive channel change task routine 340, a first block of that routine 342, directs the processor circuit 251 to initialize variables etc. associated therewith and then to execute a further block 344 to determine whether a receive channel change message has been received in the event queue. If no channel change message has been received, the processor circuit 251 is directed to block 346 causing it to yield to the operating system scheduler. In effect therefore, the receive channel change routine 340 operates in a loop comprised of blocks 344 and 346 until a receive channel change message is received. In effect, the routine is suspended pending receipt of a channel change message in the event queue.

Figure 7:
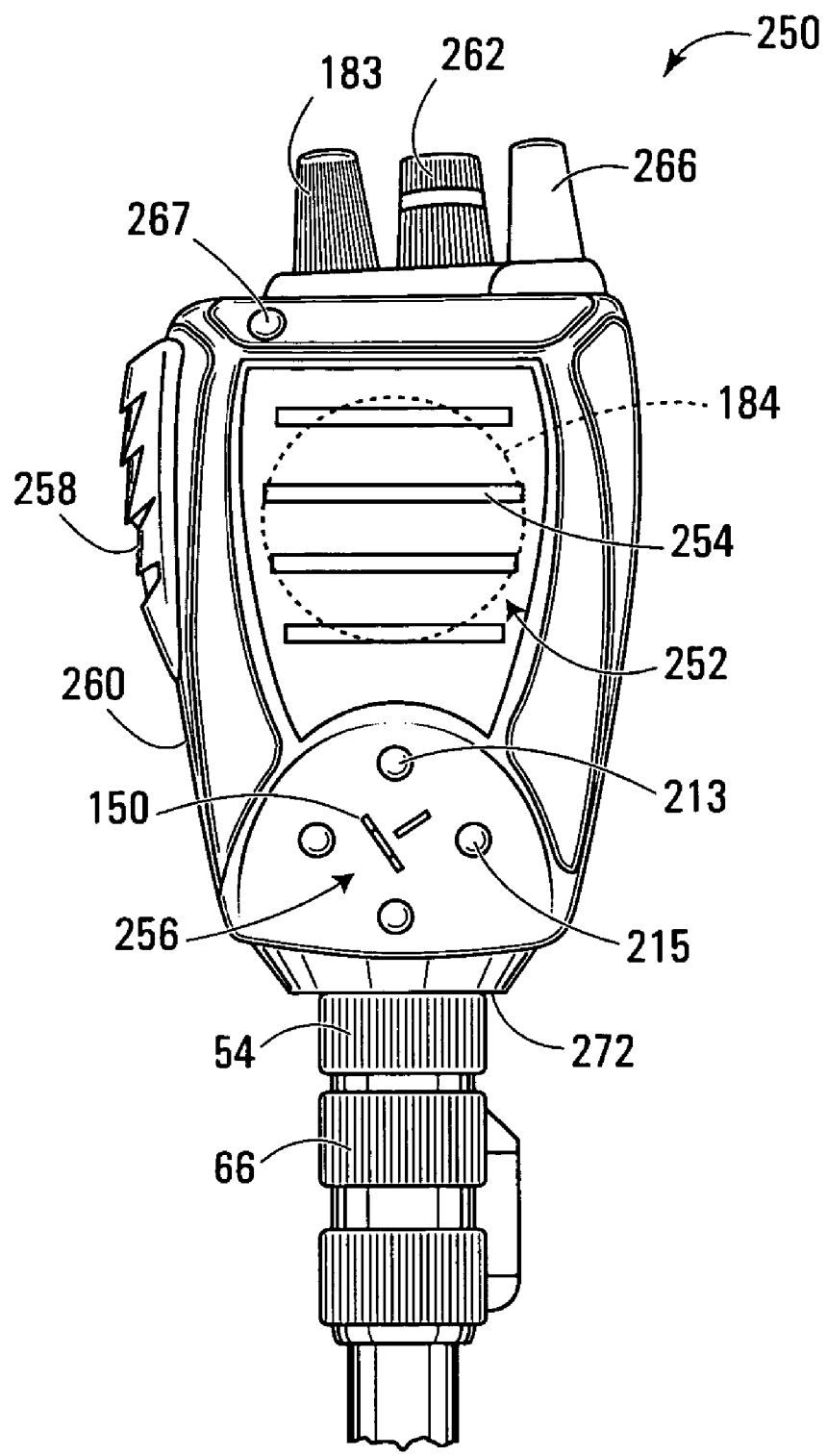
FIG. 7 is a schematic representation of a housing for the apparatus shown in FIG. 5.

Referring to FIG. 12, the receive channel change interrupt service routine 338 produces a receive channel change message in response to actuation of the channel change selector switch actuator (262 in FIG. 7). When the channel selector switch actuator (262) is actuated, a first block 348 of the receive channel change interrupt service routine 338 initializes variables associated with that routine and directs the processor circuit 251 to block 350 which causes the processor circuit 251 to produce and send a receive channel change message to the event queue. The receive channel change interrupt service routine 338 is then ended.

Referring to FIG. 13, with a receive channel change message in the event queue, when the operating system scheduler addresses the message, block 344 directs the processor circuit 251 to resume processing. Block 352 directs the processor circuit 251 to stop all other tasks of equal and lower priority and block 354 directs the processor circuit 251 to configure the second transceiver to receive on a new channel in the first frequency band (18). To do this, the processor circuit 251 communicates with the second radio transceiver 104 by appropriately setting the mode output 297 and channel select output 299 to cause the second transceiver to tune to receive at a preset carrier frequency within the first frequency band (18). In this embodiment, this frequency may be in the range of 902 to 928 megahertz, for example. Each time a channel change message is received in the event queue, the channel change interrupt service routine 338 and channel change routine 340 direct the processor circuit 251 to communicate with the second radio transceiver 104 to select a new receive channel in the range given. There may be 5 receive channels within this range, for example, and actuation of the channel selection signal generator 192 causes each channel to be selected successively corresponding to each detent position associated with the channel selector switch actuator 262. After an identification of an new receive channel has been sent to the second radio transceiver 104, block 356 directs the processor circuit 251 to restart all stopped tasks that were stopped by block 352, and to return to block 346 to yield to the operating system scheduler again and wait for another receive channel change message.

Second Transceiver Transmit Channel Change Tasks

Referring back to FIG. 8, after creating the receive channel change tasks at block 334, block 358 directs the processor circuit 251 to create transmit channel change tasks with priority 2, which include a transmit channel change interrupt service routine shown at 360 in FIG. 14 and a transmit channel change message handler shown generally at 362 in FIG. 15. On establishing the transmit channel change message handler 362, a first block 364 of the handler directs the processor circuit 251 to initialize variables used in association with this task. Then, the processor circuit 251 is directed to block 366 which causes it to determine whether or not a transmit channel change message has been received in the event queue. If not, block 368 directs the processor circuit 251 to yield to the operating system scheduler.

Effectively, blocks 366 and 368 direct the processor circuit 251 to remain in a loop waiting for a transmit channel change message. In effect, the transmit channel change message handler 362 is suspended pending receipt of a transmit channel change message in the event queue.

Referring to FIG. 14, the transmit channel change message is produced by the transmit channel change interrupt service routine 360. The transmit channel change interrupt service routine 360 is initiated on actuation of the transmit channel change switch actuator 267 which directs the processor circuit 251 to block 370 of the transmit channel change interrupt service routine 360 causing it to initialize parameters associated with that routine. Block 372 then directs the processor circuit 251 to send a transmit channel change message to the event queue.

Referring back to FIG. 15, when a transmit channel change message has been received in the event queue, block 366 directs the processor circuit 251 to block 374 which directs the processor circuit 251 to stop all other tasks of equal and lower priority. Block 376 then directs the processor circuit 251 to configure the first transmit output 30 for data transmission to the second radio transceiver 104. Block 378 then directs the processor circuit 251 to send a channel change command to the second radio transceiver 104 in accordance with a protocol set by the manufacturer of the second transceiver. This channel change command is transmitted by the second transceiver to the remote transceiver 101 on the mask 103 worn by the emergency response person. In response, the remote transceiver 101 configures itself to transmit on the frequency specified in the channel change command. The first transmission by the remote transceiver 101 on this frequency is an acknowledgement signal.

Block 380 is an optional block which may be necessary depending upon the protocol for communication of channel change messages to the remote transceiver 101. In this embodiment, the manufacturer of the second transceiver is Chipcon AS and the remote transceiver 101 requires some time to respond to a channel change command. In this regard, a time period of 100 milliseconds has been found to be useful and therefore block 380 directs the processor circuit 251 to provide a 100-millisecond delay before further processing. After the 100-millisecond delay, block 382 directs the processor circuit to determine whether a transmitter acknowledgement has been received from the second transceiver 104, at the second receive input 64, indicating that an acknowledgement has been received from the remote transceiver 101. If not, block 384 directs the processor circuit to determine whether a predefined timeout has expired and if not, the processor is directed back to block 382 to wait for an acknowledgment. In effect, after the 100 millisecond delay provided by block 380, if no acknowledgement is received from the second radio transceiver 104 within a specified time period, the processor circuit 251 is directed to block 386 which causes it to actuate the second indicator 215 to indicate that a problem exists in communicating with the second radio transceiver 104. Then, block 388 directs the processor circuit 251 to determine whether or not the channel change switch actuator 267 is still pressed and if so, the processor circuit is directed back to block 378 to attempt to send another transmit channel change message to the first transceiver 104. If at block 388, the transmit channel change switch actuator 267 is no longer actuated, block 390 directs the processor circuit 251 to restart all tasks that were stopped at block 374 and to continue processing according to the event scheduler. If at block 382, the acknowledgement is received from the second radio transceiver 104, block 392 directs the processor circuit 251 to actuate the second indicator 215 to indicate that the remote transmit channel of the remote transceiver was successfully changed. The processor circuit 251 is then directed to block 390 to restart all tasks that were stopped at block 374 and to continue processing according to the event queue.

First Transceiver Power Tasks

Figure 16:
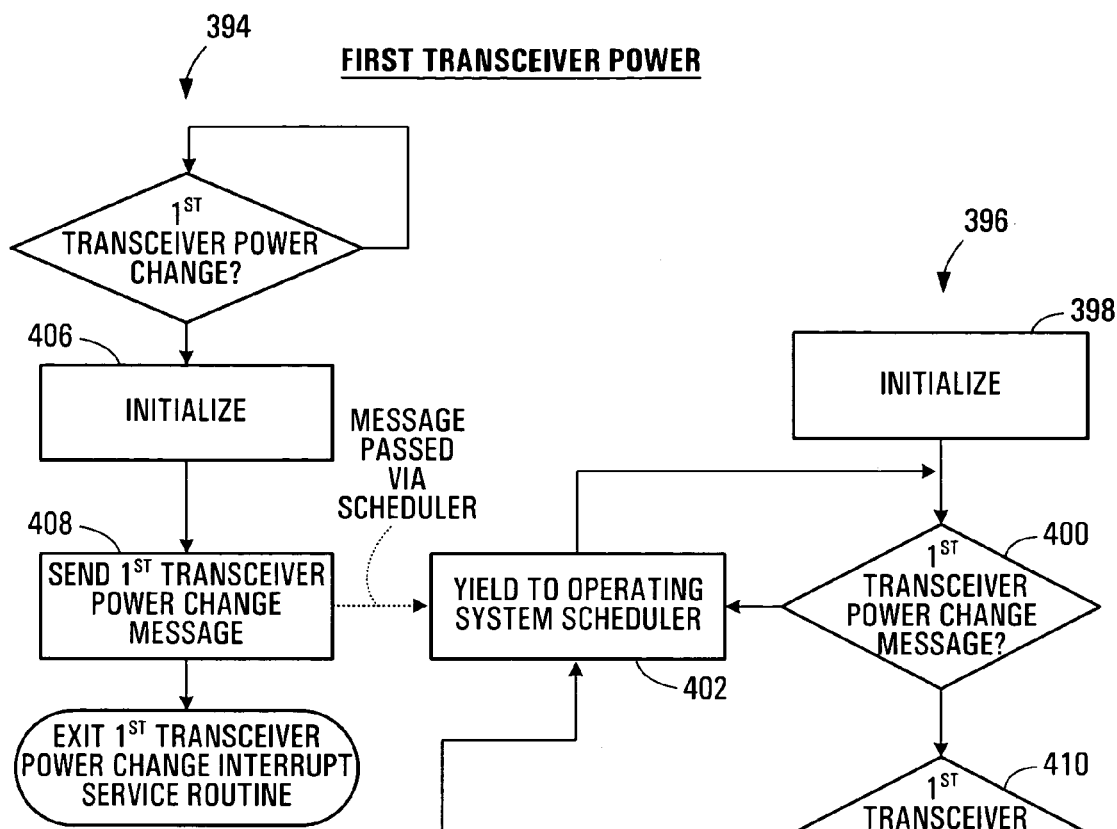
FIG. 16 is a flowchart of a first transceiver power monitor interrupt service routine executed by the processor circuit of the apparatus shown in FIG. 5.

Referring back to FIG. 8, after creating the transceiver channel change task, block 392 directs the processor circuit 251 create first transceiver power monitor tasks having a priority of 3. Referring-to FIGS. 16 and 17, the first transceiver power monitor tasks include a first transceiver power change interrupt service routine shown generally at 394 in FIG. 16 and a first transceiver power message handler shown generally at 396 in FIG. 17. The first transceiver power monitor handler 396 includes a first block 398 which is invoked immediately upon creation of the task to initialize all variables associated with that routine. After initialization of variables, block 400 directs the processor circuit 251 to determine whether a first transceiver power change message has been received and if not, block 402 directs the processor circuit 251 to yield to the event scheduler to address the next event in the queue. Effectively, blocks 400 and 402 form a loop causing the processor circuit 251 to wait until a first transceiver power change message is received in the event queue.

The first transceiver power change interrupt service routine shown in FIG. 15 is continually executed and includes a first block 404 that directs the processor circuit 251 to poll the power signal sense input (60 in FIG. 5) to determine whether or not there is a change in the status of the signal received at that input. The processor circuit 251 continues executing block 404 until there is a change in that signal and when a change occurs, block 406 directs the processor circuit to enter the first transceiver power change interrupt service routine. This routine includes block 408 which directs the processor circuit to produce and send a first transceiver power change message to the event queue.

Figure 17:
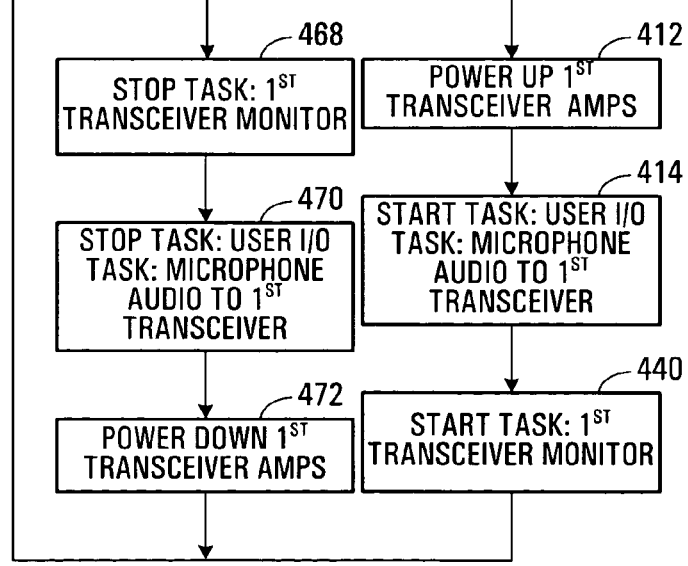
FIG. 17 is a flowchart of a first transceiver power monitor routine executed by the processor circuit of the apparatus shown in FIG. 5.

Referring to FIGS. 5 and 17, when a first transceiver power change message is received in the event queue, block 400 directs the processor circuit to block 410 which causes it to determine the state of the signal received at the power signal sense input 60. If the state of the signal indicates that power is received from the first radio transceiver 53, block 412 directs the processor circuit 251 to enable the transmit output signal conditioning circuit 216 and to enable the variable gain amplifier 208 and signal conditioning circuit 206 to permit signals to be communicated from the first transmit output 30 to the first radio transceiver 53 and to permit signals to be received from the first radio transceiver 53 at the second receive input 64. Block 414 then directs the processor circuit to start an input audio to first transceiver task as shown at 416 in FIG. 18.

Audio to First Transceiver Routine

Figure 18:
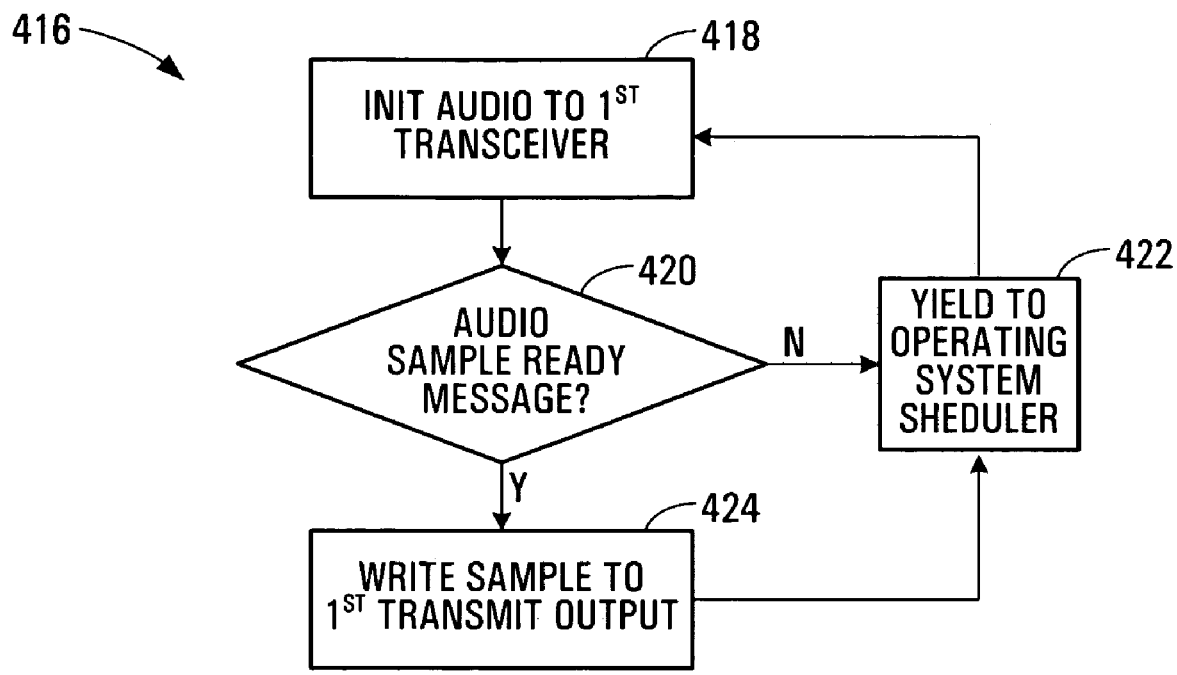
FIG. 18 is a flowchart of an input audio to first transceiver routine executed by the processor circuit of the apparatus shown in of FIG. 5.

Referring to FIG. 18, the input audio to first transceiver task begins with an initialization block 418 and is followed by a block 420 that causes the processor circuit 251 to determine whether or not an audio sample is ready in the FIFO buffer 157 of the RAM 158 accessible by the processor circuit 251. If no sample is ready, block 422 directs the processor circuit 251 to deal with the next event in the event queue. If a sample is ready in the FIFO buffer, block 424 directs the processor circuit to copy the sample to the first transmit output 30 where it is processed by the signal conditioning circuit 216 and sent through the isolation circuit 200 to the first radio transceiver 53, for transmission in the second frequency band.

First Transceiver Monitor Task

Figure 19:
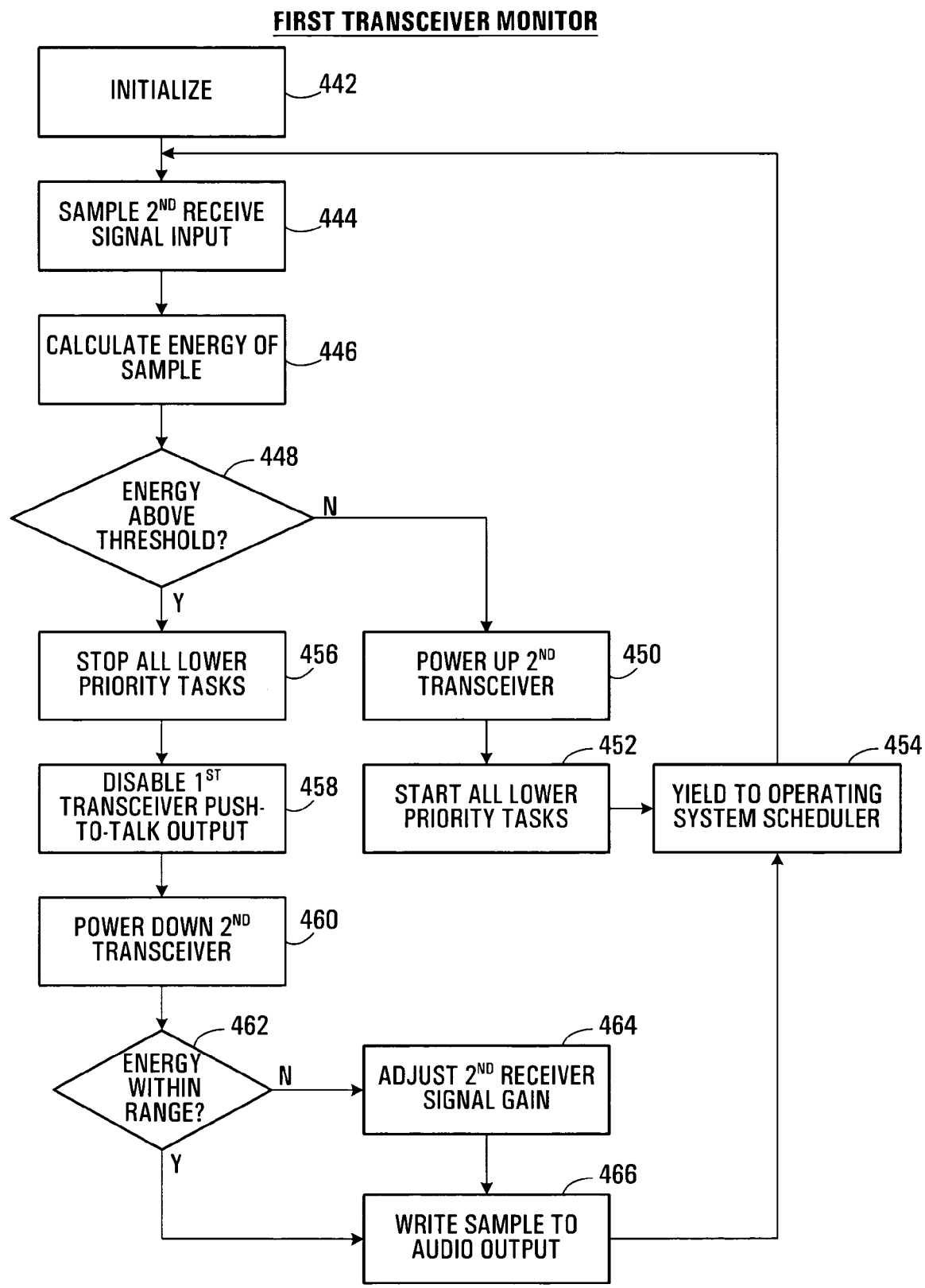
FIG. 19 is a flowchart of a first transceiver monitor routine executed by the processor circuit of the apparatus shown in FIG. 5.

Referring back to FIG. 17, after the input audio to first transceiver task has been started at block 414, block 440 directs the processor circuit 251 to start a first transceiver monitor task having a priority of 4, as shown in FIG. 19. Referring to FIG. 19, the first transceiver monitor task begins with a first block 442 that directs the processor circuit 251 to initialize variables associated with this task. Block 444 then directs the processor circuit 251 to cause the analog to digital converter 210 in communication with the second receive input 64 to sample the signal received at that input. Block 446 then directs the processor circuit 251 to calculate the energy associated with the sample such as by squaring the sample value and block 448 directs the processor circuit 251 to determine whether or not the calculated energy is above a threshold. If the energy is not above a threshold, block 450 directs the processor circuit 251 to enable the second transceiver, if it had previously been disabled and block 452 directs the processor circuit to start all lower priority tasks if any have been stopped. Block 454 then directs the processor circuit 251 to yield to the operating system scheduler to deal with the next event in the event queue. If at block 448, the calculated energy of the sample is above a threshold level, block 456 directs the processor circuit 251 to stop all lower priority tasks and block 458 directs the processor circuit to disable the first transceiver push to talk line by setting the push-to-talk signal output 217 inactive. Block 460 then directs the processor circuit 251 to disable to second radio transceiver 104 by setting the chip select of the second transceiver to inactive and block 462 directs the processor circuit to determine whether or not the energy associated with the sample is within a predefined range. This range may be the same as the range associated with samples received at the audio input 24, for example. If the sample energy is not within the desired range, block 464 directs the processor circuit 251 to adjust the gain of the variable gain amplifier 208 with the hope that the next received sample will be within the desired range. Block 466 then directs the processor circuit 251 to forward the sample to the digital to analog converter 186 at the audio output 28, where the sample is conditioned by the signal conditioning circuit 180 amplified by the variable gain power amp 182 and converted into acoustic energy by the speaker 184.

Referring back to FIG. 17, if at block 410 it is determined that the first transceiver power signal (at power signal sense input 60 in FIG. 5) is not active, block 468 directs the processor circuit 251 to stop the first transceiver power monitor task shown in FIG. 19 and then block 470 directs the processor circuit 251 to stop the input audio to first transceiver tasks shown in FIG. 18. Block 472 then directs the processor circuit 251 to disable the signal conditioning circuits 206 and 216, and the variable gain amplifier 208, to conserve power. The processor circuit 251 is then directed back to block 402 causing it to deal with the next event in the event queue.

Figure 20:
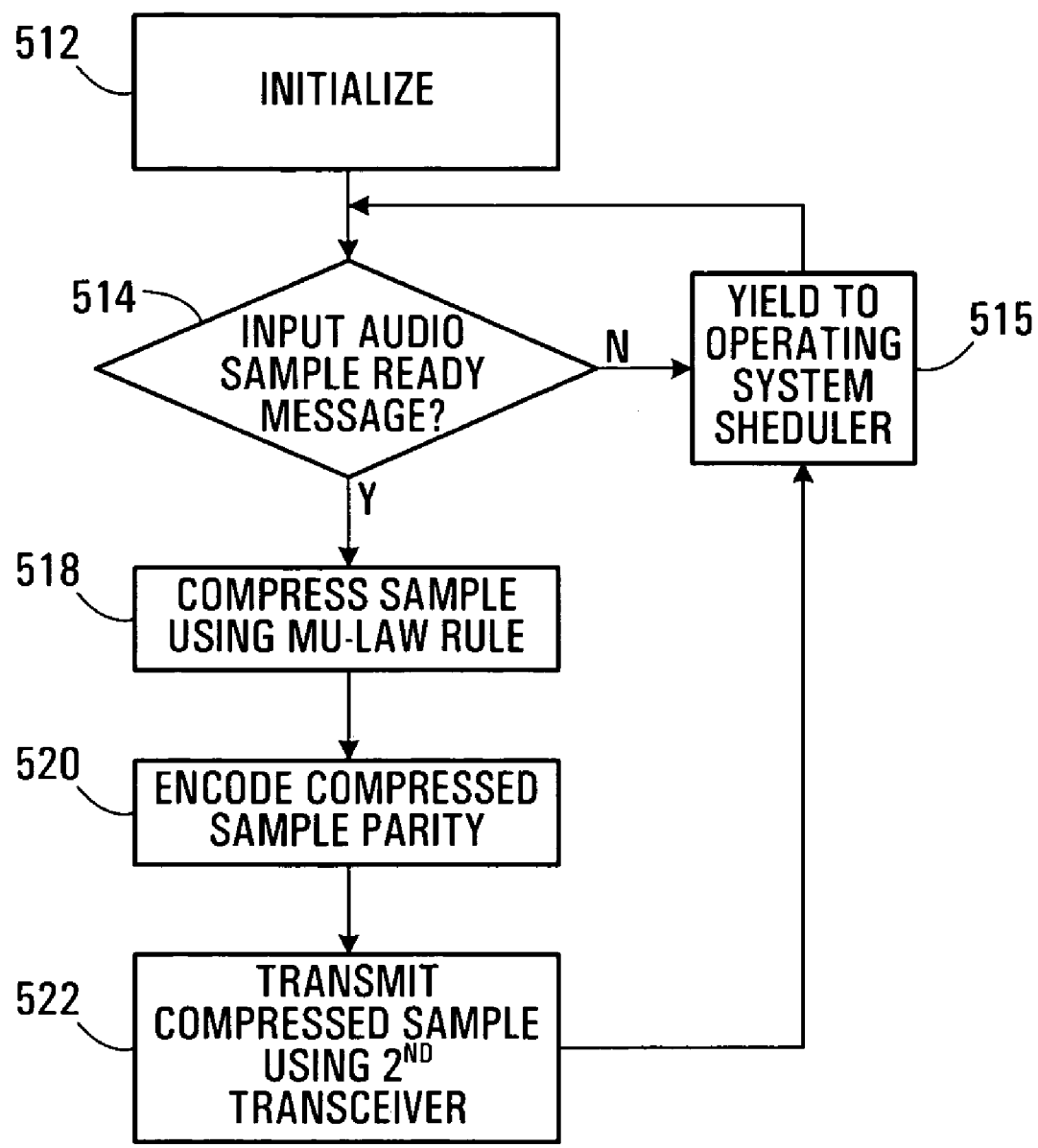
FIG. 20 is a flowchart of an input audio to second transceiver task executed by the processor circuit of the apparatus shown in FIG. 5.

Input Audio to Second Transceiver Task—FIG. 20

Referring back to FIG. 8, after creating the first transceiver power monitor task at block 392, block 475 directs the processor circuit 251 to create an input audio to second transceiver task with a priority of 6, as shown in FIG. 20. Referring to FIG. 20, the input audio to second transceiver task begins with a first block 512 that initializes parameters associated with this task. Block 514 then directs the processor circuit 251 to determine whether a sample ready message is in the event queue and if not, block 515 directs the processor circuit to yield to the operating system scheduler until an audio sample ready message is received. When such message is received, block 518 directs the processor circuit to compress the sample using the mu-law rule and block 520 directs the processor circuit 251 to encode the compressed sample into a digital format, with a parity bit and block 522 directs the processor circuit to activate the second transmit output 106 to transmit a byte representing the compressed sample via the second radio transceiver, in the first frequency band.

Second Transceiver Receive Task—FIGS. 21, 22

Referring back to FIG. 8, block 514 directs the processor circuit 251 to create a second transceiver receive task including a carrier sense interrupt service routine shown generally at 516 in FIG. 21 and a carrier present message handler shown generally at 518 in FIG. 22, with a priority of 7. The carrier message handler task includes a first block 521 that directs the processor circuit to initialize variables associated with this task. Block 523 then directs the processor circuit to determine whether a carrier is sensed by determining whether a carrier present message is in the event queue. If not, block 524 directs the processor circuit to continue scanning the event queue for the next event to occur. In effect, blocks 523 and 524 suspend the second transceiver receive task until a carrier present is placed in the event queue.

Referring to FIG. 3, a carrier present message is placed in the event queue by the carrier sense interrupt service routine 516. This routine includes a first block 526 which directs the processor circuit 251 to monitor the carrier sense input and when such input is rendered active by a signal from the second radio transceiver 104, block 528 directs the processor circuit 251 to enter the carrier sense interrupt service routine. This routine includes block 530 which causes the processor circuit 251 to produce a carrier present message and place such message in the event queue.

Referring to FIG. 22, detection of the carrier present message in the event queue occurs at block 523 which directs the processor circuit 251 to block 532 causing it to receive data at the first receive input 22 in a buffer (not shown) in the RAM 158. Block 532 directs the processor circuit 251 to search for a particular bit pattern in the received data to determine whether or not a predefined preamble has been received. If a predefined preamble has not been received, the processor circuit 251 is directed to block 524 to yield to the operating system scheduler. If the appropriate preamble has been received, then block 534 directs the processor circuit 251 to search the received data to determine whether or not a sync pattern has been received. If it has not, the processor circuit 251 is directed back to block 524. If the appropriate sync pattern has been received, the processor is directed to block 536 which causes it to search the received data to determine whether or not a packet ID has been received. If a packet ID has not been received, then the processor circuit is directed back to block 524. If a packet ID has been received, block 538 directs the processor to decompress payload data associated with the received data, to decode parity in the data as shown at 540. Block 542 then directs the processor circuit to determine whether or not there are any byte errors and if there are, block 544 directs the processor circuit 251 to correct the errors or replace the sample with an interpolated value based on previous and successive samples. Block 546 then directs the processor circuit 251 to increase a sample count indicator and block 548 directs the processor circuit 251 to supply the sample to the digital to analog converter 186 in communication with the audio output 28 to permit the signal conditioning circuit 180 and the variable gain power amp 182 to amplify the sample so that the speaker 184 can convert the sample into sound energy.

Push to Talk

Figure 23:
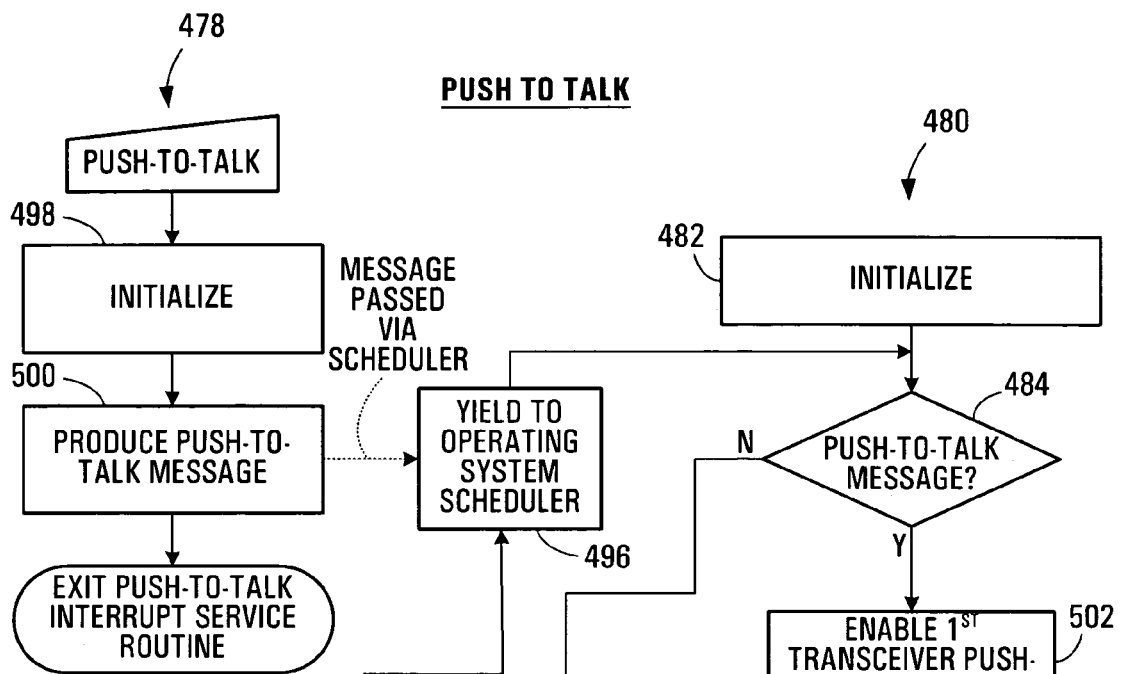
FIG. 23 is a flowchart of a push-to-talk interrupt service routine executed by the processor circuit of the apparatus shown in FIG. 5.
Figure 24:
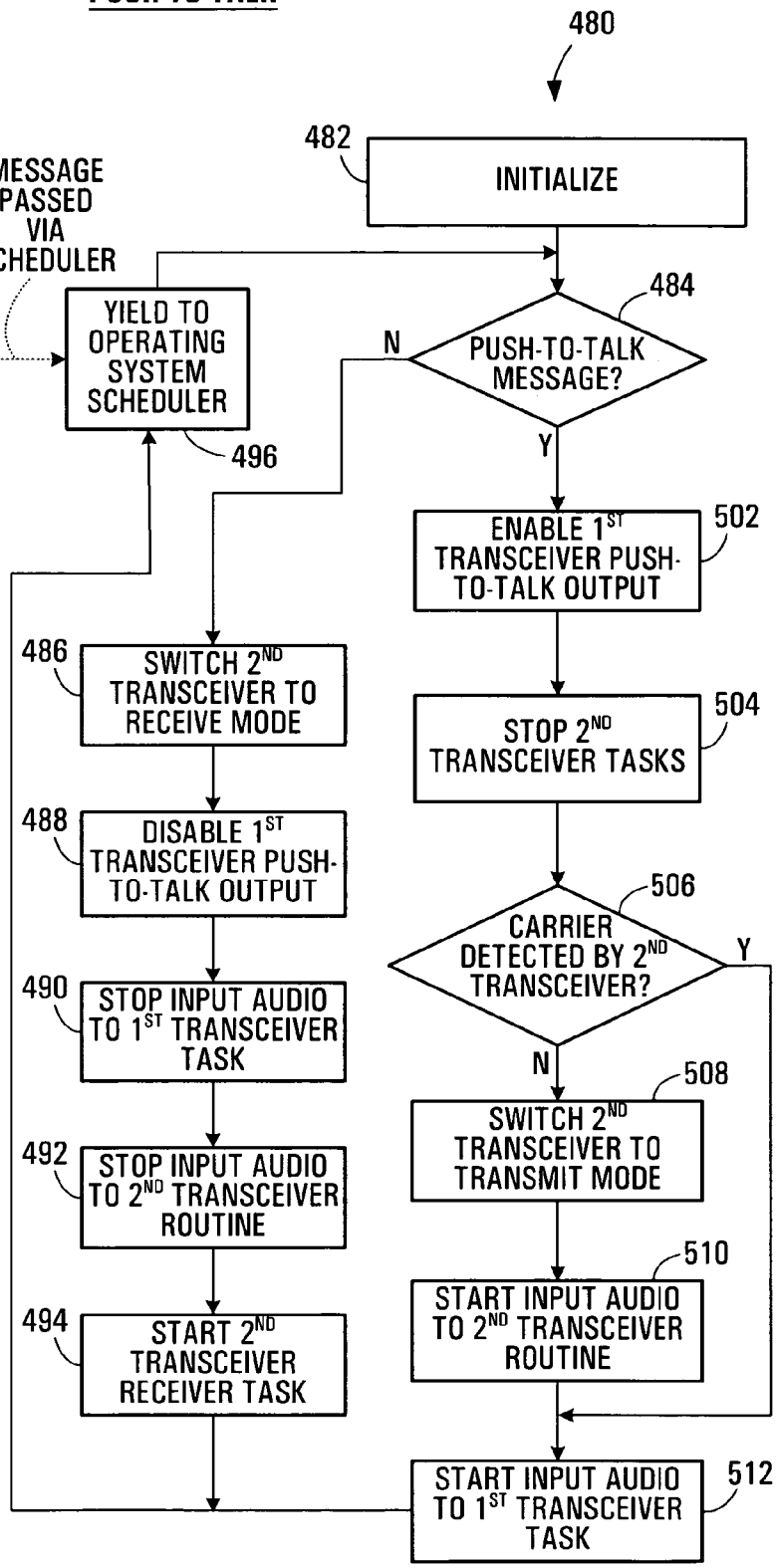
FIG. 24 is a flowchart of a push-to-talk handling routine executed by the processor circuit of the apparatus shown in FIG. 5.

Referring back to FIG. 8, block 476 directs the processor circuit 251 to create push to talk tasks with a priority of 5. Referring to FIGS. 23 and 24, the push to talk tasks include a push to talk interrupt service routine shown at 478 in FIG. 24 and a push to talk message handler shown generally at 480 in FIG. 25. The push to talk message handler begins with a first block 482 which directs the processor circuit to initialize variables associated with this task. Immediately upon creation of the task, block 484 directs the processor circuit 251 to determine whether or not the selector switch signal received at the selector input 26 is in the first state A or the second state B. The first state A is the state where the push to talk switch 258 shown in FIG. 7 is not actuated and the second state B is the state where the push to talk switch is actuated. If at block 484, the push to talk switch is not actuated, block 486 directs the processor circuit 251 to set the second radio transceiver 104 into the receive mode and block 488 directs the processor circuit 251 to disable the first transceiver push to talk output. Block 490 then directs the processor circuit 251 to stop the input audio to first transceiver task shown in FIG. 17, if in operation, and block 492 directs the processor circuit to stop the input audio to second transceiver task shown in FIG. 20.

Block 494 then directs the processor circuit to start the second transceiver receive tasks shown in FIGS. 21 and 22.

The processor is then directed to block 496 which causes it to yield to the operating system scheduler and effectively wait until a push to talk message is received.

Referring back to FIG. 23, the push to talk interrupt service routine shown at 478 is invoked in response to actuation of the push to talk switch 172 shown in FIG. 5. On actuation of this switch, block 498 directs the processor circuit 251 to enter the push to talk service routine 478 shown in FIG. 20 which includes block 500 which causes the processor circuit 251 to produce a push to talk message and insert such message in the event queue. When a push to talk message is received in the event queue, block 484 of the push to talk handler 480 shown in FIG. 24 directs the processor circuit to block 502 which causes it to enable the long-range radio push to talk line by activating the push-to-talk signal output 217. Block 504 then directs the processor circuit 251 to stop the second transceiver receive task if it was previously operating.

Block 506 then directs the processor circuit 251 to check the status of the carrier detect input 507 to determine whether or not there is a carrier present in the second transceiver receive channel. Block 508 then directs the processor circuit 251 to activate the mode output 297 to communicate with the second radio transceiver 104 to cause the second transceiver to enter a transmit mode. Block 510 then directs the processor circuit 251 to start the input audio to second transceiver task shown in FIG. 20 which causes a digital representation of a sample acquired from the microphone (e.g. a byte) to be transmitted by the second radio transceiver 104.

Referring back to FIG. 24, after a byte representing a sample has been transmitted or if at block 506 it is determined that there is a carrier present in the second transceiver receive channel, block 512 directs the processor circuit 251 to start the audio to first transceiver task shown in FIG. 17 to cause the sample to be provided to the digital to analog converter 214 to produce an analog signal at the first transmit output 30 for communication to the first radio transceiver 53. After block 512 is completed, the processor is directed back to block 496 to yield to the operating system scheduler.

From the foregoing, it will be appreciated that communications between the first radio transceiver 53 and the controller 20 are conducted by analog signals communicated between the apparatus and the first radio transceiver 53 whereas signals received and transmitted by the second transmitter are digital signals.

In a typical emergency services application, a plurality of users may wear self-contained breathing apparatuses with built-in transceivers operable to transmit digital signals in the first frequency band representing voice utterances made by a first emergency person wearing the breathing apparatus. These digital signals are received by the second radio transceiver 104 which provides a digital representation of such signals to the first receive input 22. The controller 20, then verifies that the digital signal is valid and meets various criteria and then parses payload data associated with the transmission to obtain data representing samples of the utterances made by the wearer of the breathing apparatus. These samples are then processed, to provide compression or emphasis, as required, and the processed samples are provided to the digital to analog converter 186 associated with the audio output 28, to cause the speaker 184 to acoustically reproduce the utterance made by the wearer of the breathing apparatus. Referring to FIG. 7, the speaker is located within the housing 250, which may be worn on a lapel, for example, of a second emergency response person. By wearing the housing 250 on a lapel, the housing and speaker 184 are situated relatively near the wearer's ear and thus may be heard by the second emergency response person. A plurality of emergency personnel wearing self-contained breathing apparatus as described above may all transmit on the same frequency enabling all utterances made by emergency personnel wearing breathing apparatus within a relatively small area, to be heard by wearers of the apparatus according to the present invention.

In effect therefore, the apparatus may be used to monitor communications made by emergency personnel in an area of radius about 200 ft. for example.

It is typical that such emergency personnel would each carry a hand-held UHF or VHF radio such as the first radio transceiver 53 to be able to communicate with an emergency personnel coordinator who may be located at a longer range up to 5 miles away, for example. The apparatus permits signals received at the hand-held UHF or VHF radio i.e., the first radio transceiver 53 to be received by the apparatus, at the second receive input 64, and enables these signals to be provided to the speaker 184 when such signals have a threshold amount of energy. Thus, a wearer of the apparatus is able to listen to communications from a long-range source, e.g., a coordinator away from the emergency situation, in addition to listening to the signals from the short-range sources, e.g., emergency personnel near the emergency situation.

In addition, by pressing the push to talk switch actuator 258, a wearer of the apparatus may speak into the microphone 150 and cause utterances made into the microphone to be transmitted in a digital format through the second radio transceiver 104 to wearers of other apparatuses of the type described above and to simultaneously transmit such utterances to the emergency personnel coordinator, through the UHF or VHF radio (first radio transceiver 53).

In addition, as described above, the user is provided with the ability to select different channels in the first frequency band to listen any channel within the first frequency band 18 and to selectively cause a transceiver 101 on a mask worn by an emergency response person to transmit on a desired frequency to which the second radio transceiver 104 is tuned.

Each emergency response person in an emergency response setting, may employ an apparatus of the type described, in addition to wearing a self-contained breathing apparatus with an associated transceiver 101, to facilitate monitoring communications between said emergency personnel via the second radio transceiver 104 by causing signals received thereat to be reproduced at the speaker 184, to permit simultaneous monitoring of a conventional command channel associated with existing emergency personnel communication equipment, and to facilitate selective transmission of signals back to the command coordinator on the conventional command channel while simultaneously causing such communications to occur on a digital radio channel for reception by emergency personnel in the vicinity of the second radio transceiver 104.

While specific embodiments of the invention have been described and illustrated, such embodiments should be considered illustrative of the invention only and not as limiting the invention as construed in accordance with the accompanying claims.

What is claimed is:

1. An apparatus for communicating using multiple channels, the apparatus comprising:
   means for producing a first receive signal in response to a first radio frequency signal in a first radio frequency band;
   a processor circuit having a first receive input for receiving said first receive signal, an audio input for receiving an audio in signal, a selector input for receiving a selector signal, an audio output for producing an audio out signal and a first transmitter output for producing a first transmitter signal, said first transmit output being configured for communication with a radio transmitter operable to transmit a second radio frequency signal in a second frequency band different from said first frequency band; and
   means for selectively causing said audio output to produce an audio out signal in response to said first receive signal when said selector signal is in a first state and for causing a first transmit output to produce a first transmit signal for use by a first transmitter, in response to said audio in signal, when said selector signal is in a second state and for causing a second transmit signal to be produced in response to said audio in signal when said selector signal is in said second state.

2. The apparatus of claim 1 wherein said means for selectively causing comprises a computer readable medium encoded with codes for controlling said processor circuit.

3. The apparatus of claim 2 further comprising means for housing said first radio receiver and said processor circuit.

4. The apparatus of claim 3 further comprising means for securing said housing on a person.

5. The apparatus of claim 4 further comprising means for producing said audio in signal.

6. The apparatus of claim 5 wherein said means for producing said audio in signal comprises a microphone.

7. The apparatus of claim 6 further comprising a speaker in said means for housing, for emitting an audible representation of said audio out signal.

8. The apparatus of claim 5 further comprising means for producing said selector signal.

9. The apparatus of claim 8 wherein said means for producing said selector signal comprises a switch having an actuator on said housing means, to permit a user to control a state of said selector signal.

10. The apparatus of claim 1 further comprising detecting means for detecting whether or not communications can be established with the first radio transmitter.

11. The apparatus of claim 10 wherein said means for detecting comprises means for receiving a power signal from the first radio transmitter and a computer readable medium encoded with codes for controlling said processor circuit to detect whether or not said power signal is being received from said first radio transmitter.

12. The apparatus of claim 10 further comprising means for causing said audio in signal to be communicated to said first transmit output when said detecting means determines that communications can be established with said first radio transmitter.

13. The apparatus of claim 12 further comprising means for receiving a second receive signal from a second receiver.

14. The apparatus of claim 13 further comprising a computer readable medium encoded with codes for directing said processor circuit to produce said audio out signal in response to said second receive signal when the energy of said second receive signal is greater than or equal to a threshold and said selector signal is in a first state and for directing said processor circuit to produce said audio out signal in response to said first receive signal when the energy of said second receive signal is less than said threshold and said selector signal is in said first state.

15. The apparatus of claim 14 further comprising means for measuring the energy of said receive signal.

16. The apparatus of claim 15 wherein said means for measuring the energy of said receive signal comprises a computer readable medium encoded with codes for directing said processor circuit to compute an energy value of a sample of said receive signal.

17. The apparatus of claim 15 further comprising means for amplifying said second receive signal in response to the energy of said second receive signal.

18. The apparatus of claim 1 wherein said means for producing said second transmit signal comprises a computer readable medium encoded with codes for directing said processor circuit to receive samples at said audio input and to communicate said samples to a second transmit output.

19. The apparatus of claim 18 wherein said means for producing a radio frequency transmit signal comprises a second radio frequency transceiver operable to transmit and receive radio frequency signals in said first frequency band.

20. The apparatus of claim 19 further comprising means for communicating with said second radio transceiver to cause said second radio transceiver to receive radio frequency signals on a selected receive channel.

21. The apparatus of claim 20 wherein said means for communicating comprises a computer readable medium encoded with codes for directing said processor circuit communicate with said second radio transceiver to cause said second radio transceiver to receive radio frequency signals on said selected receive channel.

22. The apparatus of claim 20 further comprising means for receiving user input indicating a desired receive channel change.

23. The apparatus of claim 22 wherein said means for receiving user input comprises a switch.

24. The apparatus of claim 23 further comprising means for communicating with a remote transceiver operable to receive and transmit signals in said first frequency band and for causing said second radio transceiver to communicate with said remote transceiver to cause said remote transceiver to transmit radio frequency signals on a selected transmit channel in said first frequency band.

25. The apparatus of claim 24 wherein said means for communicating comprises a computer readable medium encoded with codes for directing said processor circuit to communicate with said second transceiver to cause said second transceiver to communicate with said remote transceiver causing said remote transceiver to transmit radio frequency signals on a selected transmit channel in said first frequency band.

26. The apparatus of claim 24 further comprising means for receiving user input to facilitate selection of said transmit channel.

27. The apparatus of claim 26 wherein said means for receiving user input comprises a switch.

28. The apparatus of claim 1 further comprising means for producing a radio frequency transmit signal in response to said second transmit signal.

29. An apparatus for communicating using multiple channels, the apparatus comprising:
   a first radio transceiver having a first radio transmitter;
   a second radio transceiver having a second radio transmitter;

a first radio receiver in said second radio transceiver configured to produce a first receive signal in response to a first radio frequency signal in a first frequency band;

a second radio receiver in said first transceiver operably configured to produce a second receive signal in response to a second radio frequency signal in a second frequency band different from said first frequency band, said first transceiver being operably configured to communicate with a remote radio transceiver;

a controller having:
a first receive input for receiving said first receive signal;
an audio input for receiving an audio in signal;
a selector input for receiving a selector signal;
an audio output for producing an audio out signal; and
a first transmit output for producing a first transmit signal;
a second transmit output for producing a second transmit signal,
said controller being configured to:
cause said first receiver to receive said first radio frequency signal on a selected receive channel in said first frequency band;
cause said audio output to produce said audio out signal in response to said first receive signal when said selector signal is in a first state;
cause said first transmit output to produce said first transmit signal in response to said audio in signal when said selector signal is in a second state; and
cause said second transmit output signal to produce said second transmit signal in response to said audio in signal when said selector signal is in a second state;
wherein said first radio transmitter produces a second radio frequency signal in said second frequency band, in response to said first transmitter signal; and
said second radio transmitter produces a radio frequency signal in said first frequency band in response to said second transmit signal.

30. The apparatus of claim 29 further comprising a housing for housing said first radio receiver and said controller.

31. The apparatus of claim 30 wherein said housing is operable to be worn on a person.

32. The apparatus of claim 31 further comprising a microphone in said housing and operable to produce said audio in signal.

33. The apparatus of claim 32 further comprising a selector signal generator on said housing for producing said selector signal.

34. The apparatus of claim 31 further comprising a speaker in said housing and operable to produce an audible representation of said audio out signal.

35. The apparatus of claim 34 wherein said selector signal generator comprises a switch on said housing, said switch having an actuator on said housing to permit a user to control said selector signal.

36. The apparatus of claim 35 further comprising an interface configured for communication with the first radio transmitter, said interface being in communication with said first transmit output.

37. The apparatus of claim 36 wherein said controller is configured to communicate with said interface to detect whether or not communications can be established with the first radio transmitter.

38. The apparatus of claim 37 wherein said interface includes a connector and wherein said connector is operable to receive a power signal from the first radio transmitter and wherein said controller is configured to detect said power signal to determine whether or not communications can be established with the first radio transmitter.

39. The apparatus of claim 38 wherein said controller is configured to cause said audio in signal to be communicated to said first transmit output when said controller determines that communications can be established with said first radio transmitter.

40. The apparatus of claim 36 wherein said controller has a second receive input, for receiving a second receive signal from a second radio receiver.

41. The apparatus of claim 40 wherein said controller is configured to cause said audio out signal to be produced in response to said second receive signal when the energy of said second receive signal is greater than or equal to a threshold and said selector signal is in a first state and to cause said audio out signal to be produced in response to said first receive signal when the energy of said second receive signal is less than said threshold and said selector signal is in said first state.

42. The apparatus of claim 41 wherein said interface is in communication with said second receive input.

43. The apparatus of claim 42 further comprising said second receiver, said second receiver being in communication with said interface.

44. The apparatus of claim 41 wherein said controller is configured to cause said second receive signal to be amplified by a gain adjustable amplifier, and wherein said controller is configured to control said gain adjustable amplifier according to the energy of said second receive signal.

45. The apparatus of claim 29 wherein said first radio transceiver includes a very high frequency (VHF) radio.

46. The apparatus of claim 45 wherein said VHF radio includes a hand-held VHF radio.

47. The apparatus of claim 29 further comprising a remote radio transceiver operable to communicate with said second radio transceiver, said remote radio transceiver being on a breathing apparatus.

48. The apparatus of claim 47 further comprising a user interface in communication with said controller and operable to receive user input indicating a desired receive channel change.

49. The apparatus of claim 47 wherein said controller is configured to cause said second radio transceiver to communicate with said remote transceiver to cause said remote transceiver to transmit radio frequency signals on a selected transmit channel in said first frequency band.

50. The apparatus of claim 49 further comprising a user interface in communication with said controller for receiving user input to facilitate selection of said transmit channel.

51. A method for communicating using multiple channels, the method comprising:
wearing on a person a housing containing a first radio receiver and a controller;
producing a first receive signal in response to a first radio frequency signal received in a first radio frequency band by said first radio receiver;
amplifying a signal produced by a microphone to produce an audio in signal for receipt by the controller;
selectively causing an audio output of said controller to produce an audio out signal in response to said first receive signal when a selector signal is in a first state;
causing a first transmit output of said controller to produce a first transmit signal for use by a first transmitter, in response to said audio in signal, when said selector signal is in a second state; and producing a second transmit signal in response to said audio in signal when said selector signal is in said second state.

52. The method of claim 51 further comprising emitting an audible representation of said audio out signal through a speaker in said housing.

53. The method of claim 52 further comprising producing said selector signal.

54. The method of claim 53 wherein producing said selector signal comprises actuating an actuator on said housing, to permit a user to control a state of said selector signal.

55. The method of claim 54 further comprising detecting whether or not communications can be established with the first radio transmitter.

56. The method of claim 55 wherein detecting comprises receiving a power signal from the first radio transmitter and detecting whether or not said power signal is present.

57. The method of claim 55 further comprising causing said audio in signal to be communicated to said first transmit output when said controller determines that communications can be established with said first radio transmitter.

58. The method of claim 57 further comprising receiving a second receive signal from a second receiver.

59. The method of claim 58 further comprising producing said audio out signal in response to said second receive signal when the energy of said second receive signal is greater than or equal to a threshold and said selector signal is in a first state and producing said audio out signal in response to said first receive signal when the energy of said second receive signal is less than said threshold and said selector signal is in said first state.

60. The method of claim 59 further comprising measuring the energy of said second receive signal.

61. The method of claim 59 further comprising controlling the gain of a gain-adjustable amplifier according to the energy of said second receive signal.

62. The method of claim 59 further comprising producing a second transmit signal in response to said audio in signal when said selector signal is in said second state.

63. The method of claim 62 further comprising producing a radio frequency transmit signal in response to said second transmit signal.

64. The method of claim 63 wherein producing said radio frequency transmit signal comprises producing said radio frequency transmit signal such that said radio frequency transmit signal has a frequency within said first frequency band.

65. The method of claim 64 further comprising communicating with a second radio transceiver to cause said second radio transceiver to receive radio frequency signals on a selected receive channel.

66. The method of claim 65 further comprising receiving user input indicating a desired receive channel change.

67. The method of claim 66 further comprising communicating with a remote transceiver operable to receive and transmit signals in said first frequency band and causing said second radio transceiver to communicate with said remote transceiver to cause said remote transceiver to transmit radio frequency signals on a selected transmit channel in said first frequency band.

68. The method of claim 67 further comprising receiving user input to facilitate selection of said transmit channel.

69. The method of claim 51 further comprising producing a radio frequency transmit signal in response to said second transmit signal.

70. The method of claim 69 wherein producing said radio frequency transmit signal comprises producing said radio frequency transmit signal such that said radio frequency transmit signal has a frequency within said first frequency band.

71. The method of claim 70 further comprising communicating with said first radio transceiver to cause said first radio transceiver to receive and transmit radio frequency signals on a selected receive channel.

72. The method of claim 71 further comprising receiving user input to facilitate selection of said receive channel.

73. A method for communicating using multiple channels, the method comprising:

communicating with a first radio transceiver to cause said first radio transceiver to receive and transmit radio frequency signals on a selected receive channel in a first radio frequency band, said first radio transceiver producing a first receive signal in response to a first radio frequency signal received in said first radio frequency band;

receiving an audio in signal;

selectively causing an audio output to produce an audio out signal in response to said first receive signal when a selector signal is in a first state, causing a first transmit output to produce a first transmit signal for use by a first transmitter, and producing a second transmit signal in response to said audio in signal when said selector signal is in said second state.

producing a radio frequency transmit signal having a frequency within said first frequency band, in response to said second transmit signal.

74. The method of claim 73 further comprising receiving user input to facilitate selection of said receive channel.

* * * * *